United States Patent
Enomoto

(10) Patent No.: US 11,904,949 B2
(45) Date of Patent: Feb. 20, 2024

(54) VEHICULAR STEERING DEVICE

(71) Applicant: Hitachi Astemo, Ltd., Hitachinaka (JP)

(72) Inventor: Satoshi Enomoto, Tochigi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/925,906

(22) PCT Filed: Jun. 16, 2020

(86) PCT No.: PCT/JP2020/023569
§ 371 (c)(1),
(2) Date: Nov. 17, 2022

(87) PCT Pub. No.: WO2021/255825
PCT Pub. Date: Dec. 23, 2021

(65) Prior Publication Data
US 2023/0182804 A1 Jun. 15, 2023

(51) Int. Cl.
*B62D 3/12* (2006.01)
*F16H 19/04* (2006.01)

(52) U.S. Cl.
CPC ............ *B62D 3/126* (2013.01); *F16H 19/04* (2013.01); *F16H 2019/046* (2013.01)

(58) Field of Classification Search
CPC ........ B62D 3/126; B62D 3/12; B62D 5/0448; F16H 19/04; F16H 2019/046; F16F 7/00
See application file for complete search history.

(56) References Cited

U.S. PATENT DOCUMENTS

| 2001/0001932 A1* | 5/2001 | Kobayashi | B62D 3/12 |
| | | | 74/388 PS |
| 2015/0158520 A1* | 6/2015 | Watanabe | B62D 3/126 |
| | | | 280/93.514 |
| 2018/0334187 A1* | 11/2018 | Kato | B62D 3/12 |

FOREIGN PATENT DOCUMENTS

| DE | 102014113666 A1 * | 3/2016 | B62D 3/12 |
| EP | 3159241 A1 * | 4/2017 | B62D 3/12 |
| GB | 2524604 A * | 9/2015 | B62D 3/12 |

(Continued)

OTHER PUBLICATIONS

Kogure, Steering Unit, Jun. 22, 2015, EPO, JP 2015112960 A, Machine Translation of Description (Year: 2015).*

*Primary Examiner* — Paul N Dickson
*Assistant Examiner* — Matthew D Lee
(74) *Attorney, Agent, or Firm* — Rankin, Hill & Clark LLP

(57) ABSTRACT

A vehicular steering device includes a turning shaft, a housing storing therein the turning shaft, a stopper provided at a shaft end of the turning shaft, and an annular elastic body. An opening of the housing is formed in a U-shaped cross-sectional shape and in an annular shape opened toward the stopper by an external cylinder portion and an internal cylinder portion. The elastic body includes a first elastic portion and a second elastic portion. The first elastic portion is supported by an inner circumferential surface of the external cylinder portion and the bottom surface, and is provided with a first clearance from an outer circumferential surface of the internal cylinder portion. The second elastic portion extends toward the stopper from the first elastic portion, and is provided with a second clearance larger than the first clearance from the inner circumferential surface of the external cylinder portion.

20 Claims, 15 Drawing Sheets

(56) References Cited

FOREIGN PATENT DOCUMENTS

JP          2015112960 A  *  6/2015
JP            6209114       10/2017

* cited by examiner

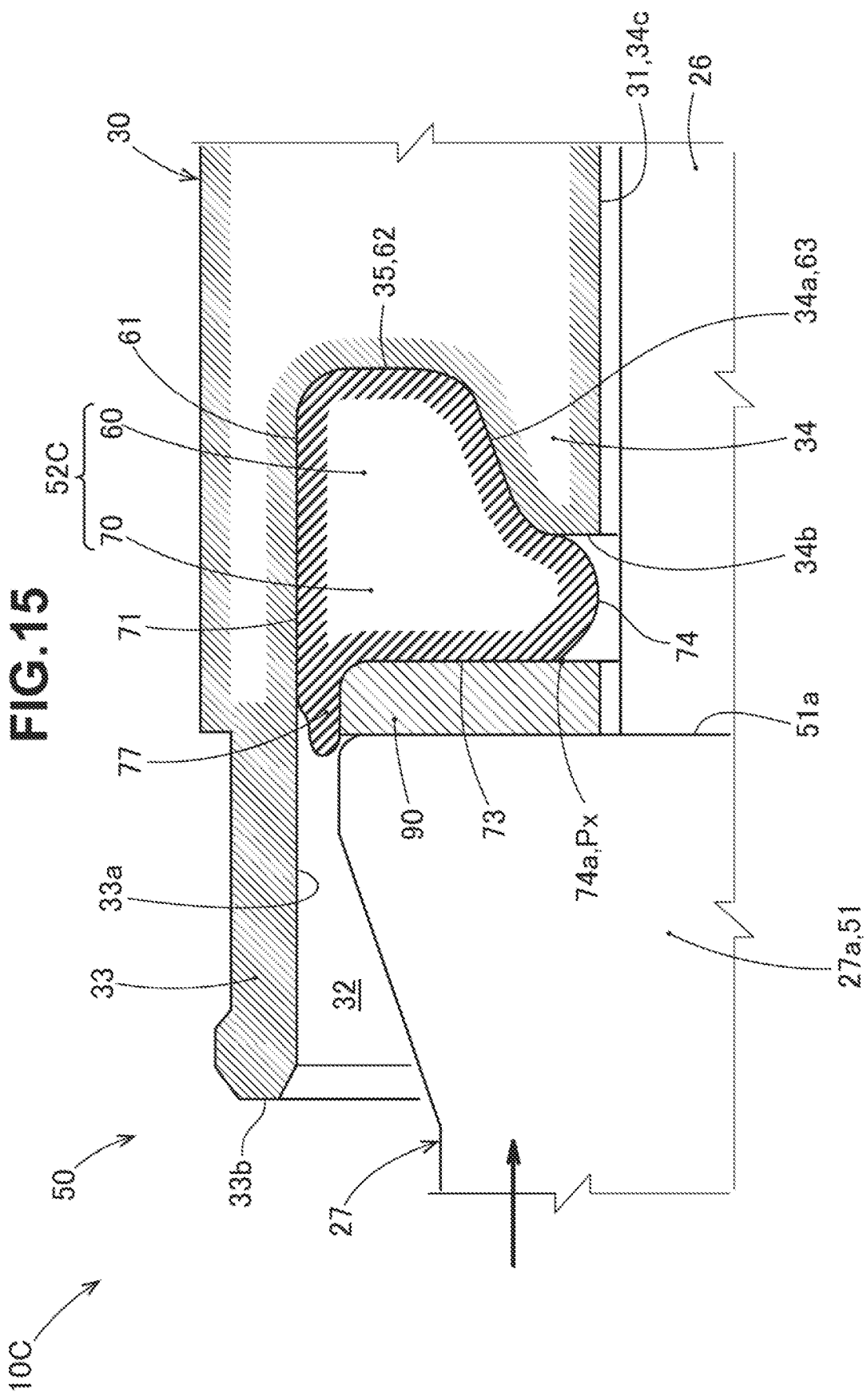

VEHICULAR STEERING DEVICE

TECHNICAL FIELD

The present disclosure relates to a vehicular steering device that includes a stopper provided at a shaft end of a turning shaft (e.g., a rack shaft), and an elastic body that attenuates a collision with the stopper.

BACKGROUND ART

In vehicular steering devices that are commonly utilized, there is a so-called rack-and-pinion type steering device that converts a rotation motion from a steering wheel into an axial motion of a rack shaft (a turning shaft) by rack and pinion. The rack shaft is stored in a housing so as to be movable in a vehicle widthwise direction. A stopper (a rack end) is provided at a shaft end of the rack shaft. When the stopper slackly abuts an elastic body (a buffer member) provided at an end of the housing, the movement of the rack shaft and that of the stopper are restricted. This kind of vehicular steering device is disclosed in, for example, Patent Document 1.

The elastic body (the buffer member) of the vehicular steering device disclosed in Patent Document 1 includes a low-spring-rate portion and a high-spring-rate portion, and is integrally molded by a single kind of elastic material. The low-spring-rate portion and the high-spring-rate portion are each in an annular shape around the rack shaft, and are arranged in line in the vehicle widthwise direction. The low-spring-rate portion protrudes toward the stopper from the tip surface of the high-spring-rate portion. The width of the low-spring-rate portion in the radial direction is smaller than the width of the high-spring-rate portion in the radial direction. The pressure receiving area of the low-spring-rate portion is smaller than the pressure receiving area of the high-spring-rate portion. Hence, the spring rate of the low-spring-rate portion is smaller than the spring rate of the high-spring-rate portion. The low-spring-rate portion is compressed and deformed in preference to the high-spring-rate portion. When the elastic body receives small abutment load by a normal steering operation, the low-spring-rate portion is deformed and absorbs such load. When the elastic body receives large shock load, the low-spring-rate portion and the high-spring-rate portion are deformed, and absorb such load. Accordingly, the load that the steering device receives can be attenuated.

CITATION LIST

Patent Literatures

Patent Document 1: Japan Patent No. 6209114

SUMMARY OF INVENTION

Technical Problem

The elastic body disclosed in Patent Document 1 employs a structure in which the low-spring-rate portion and the high-spring-rate portion are arranged side by side in a line in the vehicle widthwise direction. Accordingly, the characteristics of the compression and deformation amount of the elastic body relative to compression load applied to the elastic body from the stopper, i.e., load absorbing characteristics are two-stage characteristics. In recent years, there is a demand to further enhance the steering feeling of a vehicular steering device. In order to do so, it is preferable that the elastic body should have further fine load absorbing characteristics.

An objective of the present disclosure is to provide a vehicular steering device that includes an elastic body that has further fine load absorbing characteristics.

Solution to Problem

Upon keen research and development, the inventor of the present disclosure achieved a technical knowledge such that, by designing a clearance as appropriate between the housing and the elastic body, it becomes possible to provide an elastic body that has further fine load absorbing characteristics. The present disclosure has been accomplished in view of such a technical knowledge.

The present disclosure will be described below.

According to an embodiment of the present disclosure, there is provided a vehicular steering device that includes:

a turning shaft movable in a vehicle widthwise direction;

a stopper provided at an end of the turning shaft;

a housing which is extended in the vehicle widthwise direction so as to be able to store the turning shaft therein, has an opening at an end in the vehicle widthwise direction formed in a U-shaped cross-sectional shape and in an annular shape so as to be opened toward the stopper by an external cylinder portion located outwardly in a radial direction, an internal cylinder portion located inwardly in the radial direction, and an annular and flat bottom surface that closes a space between one end of the external cylinder portion and one end of the internal cylinder portion, and has a length from the bottom surface to an open end of the internal cylinder portion shorter than a length from the bottom surface to the open end of the external cylinder portion; and an elastic body through which the turning shaft passes so as to be movable in the vehicle widthwise direction, and which is formed of an annular integral molding component with elasticity that includes:

an annular first elastic portion having a same length as the length from the bottom surface to the open end of the internal cylinder portion, being fitted in the opening, having a whole surface supported by an inner circumferential surface of the external cylinder portion and the bottom surface, and being provided with a first clearance across a whole circumference from the outer circumferential surfaces of the internal cylinder portion; and an annular second elastic portion extending toward the stopper from the first elastic portion and being provided with a second clearance across the whole circumference from the inner circumferential surface of the external cylinder portion, the second clearance being larger than the first clearance.

Advantageous Effects of Invention

According to the present disclosure, a vehicular steering device is provided which includes an elastic body that has further fine load absorbing characteristics.

BRIEF DESCRIPTION OF DRAWINGS

FIG. 15 is an action diagram for a later compression stage of the elastic body illustrated in FIG. 14.

DESCRIPTION OF EMBODIMENTS

Embodiments of the present disclosure will be described below with reference to the figures. Note that the embodiments illustrated in the figures are merely examples of the present disclosure, and the present disclosure is not limited to such embodiments. In the following description, the right side and the left side mean the right side and the left side with reference to a person getting on a vehicle, and the front side and the rear side mean the front side and the rear side with reference to the travelling direction of the vehicle.

First Embodiment

A vehicular steering device 10 according to a first embodiment will be described with reference to FIG. 1 to FIG. 8.

Figure 1:
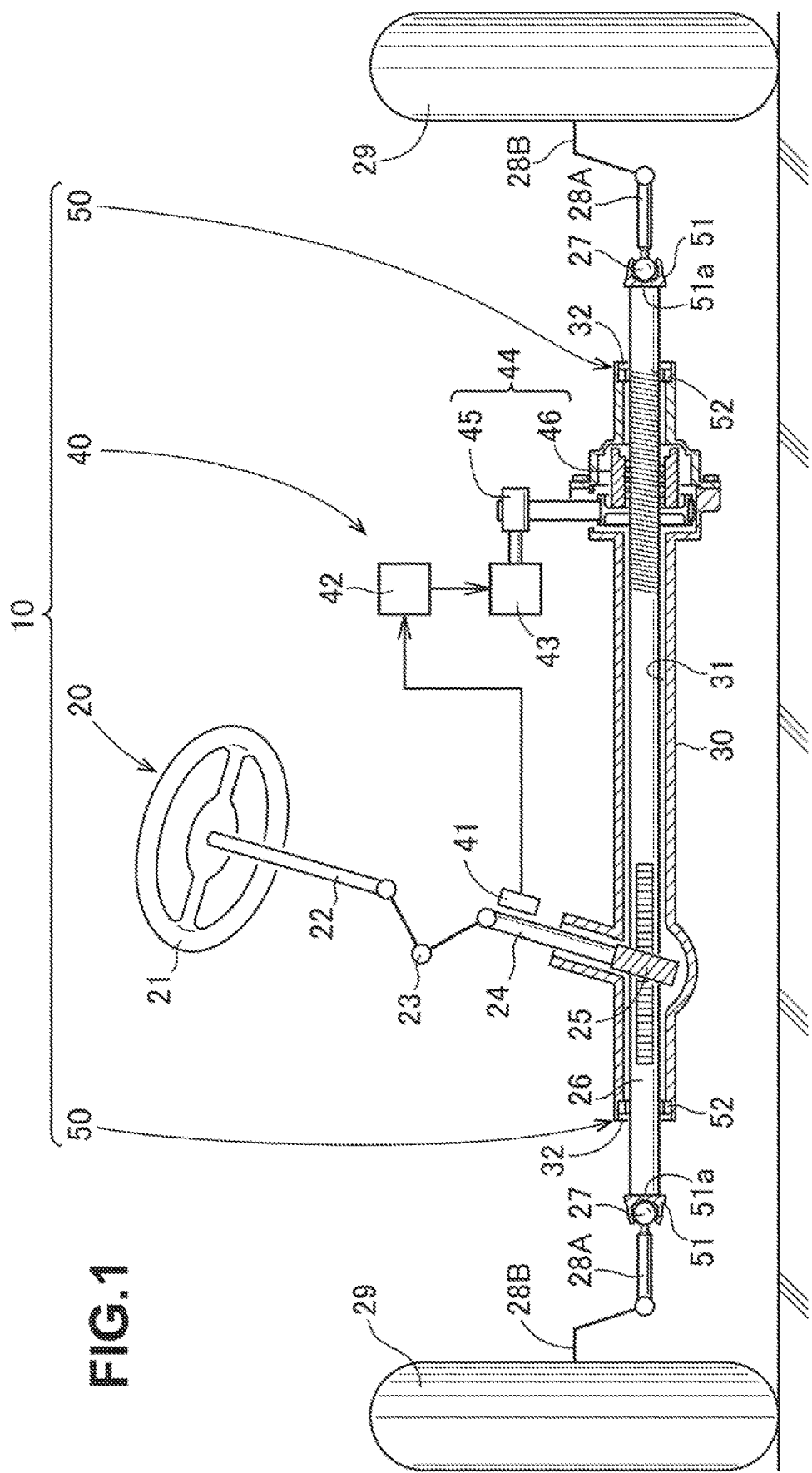
FIG. 1 is an exemplarily diagram of a vehicular steering device according to a first embodiment.

As illustrated in FIG. 1, the vehicular steering device 10 includes a steering system 20 from a steering wheel 21 of a vehicle to wheels 29 and 29 (turn wheels 29 and 29) thereof, an auxiliary torque mechanism 40 that adds auxiliary torque to the steering system 20, and right and left attenuator devices 50 and 50 at the right and left sides (respective sides in the vehicle widthwise direction), respectively.

The steering system 20 includes the steering wheel 21, a steering shaft 22 coupled to the steering wheel 21, an input shaft 24 coupled to the steering shaft 22 by a universal joint 23, a turning shaft 26 coupled to the input shaft 24 by a first transmission mechanism 25, and the right and left (respective sides in the vehicle widthwise direction) wheels 29 and 29 coupled to the respective ends of the turning shaft 26 through respective ball joints 27 and 27, respective tie rods 28A and 28A, and respective knuckles 28B and 28B.

The first transmission mechanism 25 includes, for example, a rack-and-pinion mechanism. The turning shaft 26 is movable in the vehicle widthwise direction within a through-hole 31 of the housing 30. Respective ends of the turning shaft 26 protrude from respective ends of the housing 30 in the vehicle widthwise direction. The ball joints 27 and 27 are provided at respective ends of the turning shaft 26 in the lengthwise direction.

The housing 30 is extended in the vehicle widthwise direction so as to be able to store the turning shaft 26 therein, and is provided with the through-hole 31 passing completely through in the vehicle widthwise direction, and openings 32 and 32 located at respective ends in the vehicle widthwise direction. These openings 32 and 32 are each a hole in a circular shape with a bottom and each of which is concentric to the corresponding through-hole 31, and which has a larger diameter than that of the through-hole 31.

According to the steering system 20, when a driver turns the steering wheel 21, the right and left wheels 29 and 29 can be steered through the first transmission mechanism 25, the turning shaft 26, and the right and let tie rods 28A and 28A with steering torque.

The auxiliary torque mechanism 40 includes a steering torque sensor 41, a control unit 42, an electric motor 43, and a second transmission mechanism 44. The steering torque sensor 41 detects steering torque of the steering system 20 applied to the steering wheel 21. The control unit 42 generates control signals based on torque detection signals from the steering torque sensor 41. The electric motor 43 generates motor torque (auxiliary torque) in accordance with the above-described steering torque based on the control signals from the control unit 42. The second transmission mechanism 44 transmits the auxiliary torque generated by the electric motor 43 to the above-described turning shaft 26, and includes, for example, a belt transmission mechanism 45 and a ball screw 46.

According to this vehicular steering device 10, the wheels 29 and 29 can be turned through the turning shaft 26 by combination torque obtained by adding the auxiliary torque of the electric motor 43 to the driver's steering torque.

The vehicular steering device 10 includes the right and left (respective sides in the vehicle widthwise direction) attenuator devices 50 and 50 as described above. Collision load generated when the turning shaft 26 moves up to respective stroke ends can be attenuated by the right and left attenuator devices 50 and 50. The left attenuator device 50 will be described below on the behalf of such devices.

Figure 2:
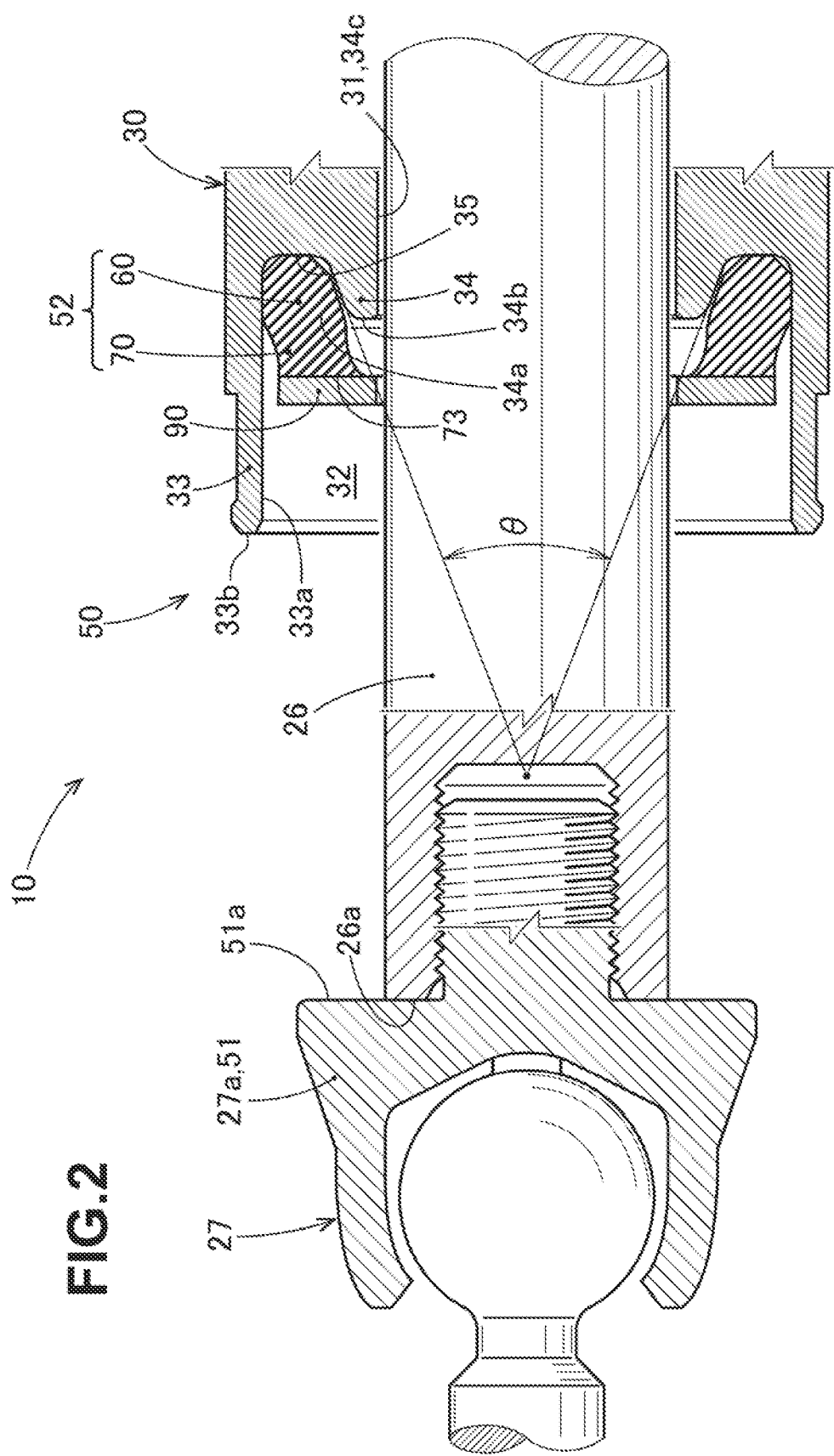
FIG. 2 is a cross-sectional view of an attenuator device illustrated in FIG. 1.

As illustrated in FIG. 2, the attenuator device 50 includes a stopper 51 and an elastic body 52.

The stopper 51 is provided at a shaft end 26a (an end 26a) of the turning shaft 26 exposed from the housing 30, and includes, for example, a holder 27a (also referred to as a joint housing 27a) of the ball joint 27. The holder 27a can move forward or retract relative to the opening 32 of the housing 30. An end surface 51a of the stopper 51 is a flat surface orthogonal to the turning shaft 26, and faces the opening 32 of the housing 30.

Figure 3:
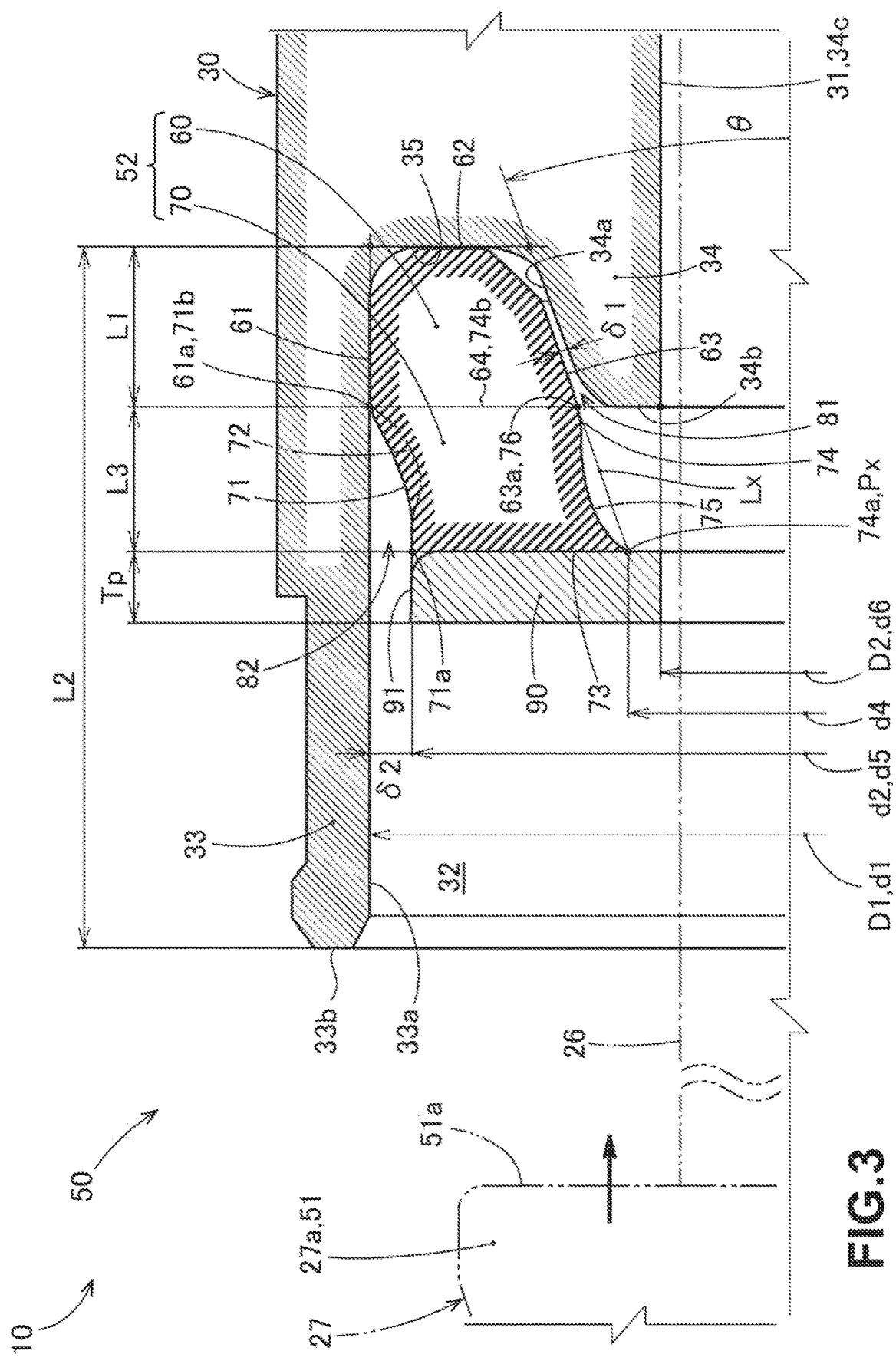
FIG. 3 is a cross-sectional view of an elastic body provided at an opening of a housing of the vehicular steering device according to the first embodiment.

As illustrated in FIG. 2 and FIG. 3, the opening 32 located at the end of the housing 30 in the vehicle widthwise direction is formed in an annular shape with a U-shaped cross section opened toward the stopper 51 by an external cylinder portion 33 (a first cylinder portion 33) located outwardly in the radial direction, an internal cylinder portion 34 (a second cylinder portion 34) located inwardly in the radial direction, and an annular bottom surface 35 (the bottom surface 35 of the opening 32) that closes a space between one end of the external cylinder portion 33 and one end of the internal cylinder portion 34.

The respective shapes of an inner circumferential surface 33a of the external cylinder portion 33 and of an outer circumferential surface 34a of the internal cylinder portion 34 are each a true circular shape that is concentric to each other. The outer circumferential surface 34a of the internal cylinder portion 34 is a tapered surface tapered toward an open end 34b of the internal cylinder portion 34 from the bottom surface 35. The outer circumferential surface 34a of the internal cylinder portion 34 will be also referred to as a "tapered surface 34a of the internal cylinder portion 34". An angle θ (a tapered angle θ) of the tapered surface 34a of the internal cylinder portion 34 is set as appropriate. The bottom surface 35 is a flat surface orthogonal to the turning shaft 26, and faces the end surface 51a of the stopper 51. A length L1 from the bottom surface 35 to the open end 34b (an opened end surface 34b) of the internal cylinder portion 34 is shorter than a length L2 from the bottom surface 35 to an open end 33b (an opened end surface 33b) of the external cylinder portion 33.

Figure 4:
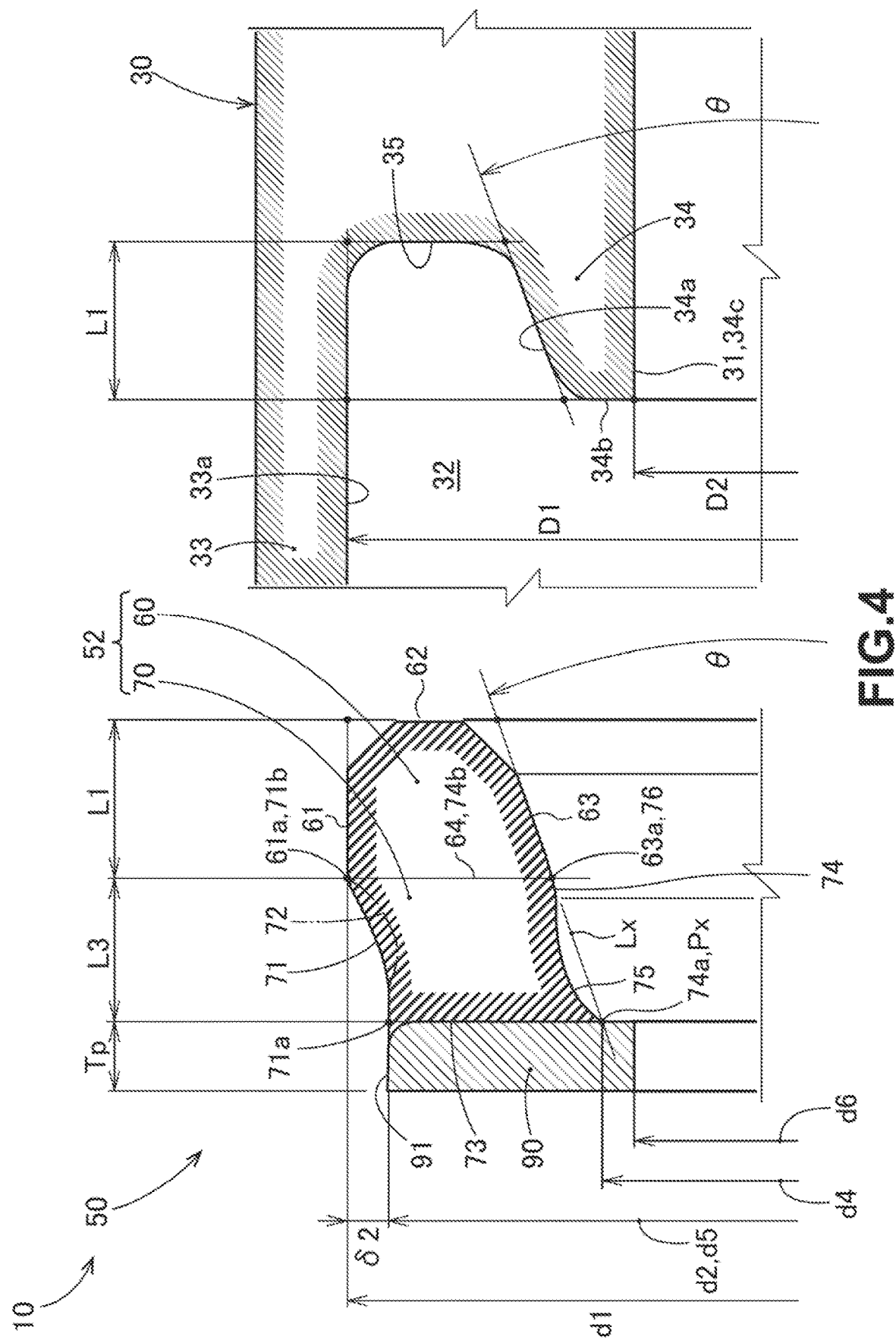
FIG. 4 is an exploded view of the opening of the housing, and of the elastic body illustrated in FIG. 3.

As illustrated in FIG. 3 and FIG. 4, The shape of an edge (a corner) between the inner circumferential surface 33a of the external cylinder portion 33 and of the bottom surface 35 is in a circular arc shape. The shape of an edge (a corner) between the outer circumferential surface 34a of the internal cylinder portion 34 and the bottom surface 35 is in a circular arc shape. The shape of an edge (a corner) between the outer circumferential surface 34a of the internal cylinder portion 34 and the open end 34b of the internal cylinder portion 34 is in a circular arc shape.

The elastic body 52 is an annular member which is provided in the opening 32 of the housing 30, and through which the turning shaft 26 is inserted so as to be movable in the vehicle widthwise direction. The elastic body 52 includes an integrally molded component with elasticity which is formed of an annular first elastic portion 60 and an annular second elastic portion 70. The elastic body 52 is formed of, for example, an elastic material, such as a urethane resin or a rubber.

The first elastic portion 60 has the length L1 that is equal to the length L1 from the bottom surface 35 of the opening 32 to the open end 34b of the internal cylinder portion 34, and is fitted in the opening 32. A whole outer circumferential surface 61 of the first elastic portion 60 is supported by the inner circumferential surface 33a of the external cylinder portion 33. Relative to a diameter D1 of the inner circumferential surface 33a of the external cylinder portion 33, a diameter d1 of the outer circumferential surface 61 of the first elastic portion 60 is designed so as to be the same or slightly larger. A whole bottom surface 62 of the first elastic portion 60 is supported by the bottom surface 35 of the opening 32.

A first clearance 81 is provided across the whole circumference between the outer circumferential surface 34a of the internal cylinder portion 34 and the inner circumferential surface 63 of the first elastic portion 60. A size δ1 of the first clearance 81 is designed with the elastic deformation amount of the whole elastic body 52 when compression load acts on the elastic body 52 from the stopper 51 being taken into consideration. It is preferable that the size δ1 of the first clearance 81 should be constant (uniform).

An inner circumferential surface 63 of the first elastic portion 60 is a tapered surface along the outer circumferential surface 34a of the internal cylinder portion 34. That is, the inner circumferential surface 63 of the first elastic portion 60 is a tapered surface tapered from the bottom surface 62 of the first elastic portion 60 toward a tip 64 thereof. The inner circumferential surface 63 of the first elastic portion 60 may be also referred to as "the tapered surface 63 of the first elastic portion 60" below. A straight line Lx extended along the tapered surface 63 of the first elastic portion 60 will be defined as "an extended line Lx of the tapered surface 63". In the first elastic portion 60, an edge (a corner) between the outer circumferential surface 61 and the bottom surface 62 and an edge (a corner) between the bottom surface 62 and the inner circumferential surface 63 are chamfered, respectively.

The second elastic portion 70 continuously extends toward the stopper 51 from the tip 64 of the first elastic portion 60. A second clearance 82 is provided across the whole circumference between an outer circumferential surface 71 of the second elastic portion 70 and the inner circumferential surface 33a of the external cylinder portion 33. A size δ2 of the second clearance 82 is designed with the elastic deformation amount of the whole elastic body 52 when compression load acts on the elastic body 52 from the stopper 51 being taken into consideration, and is larger than the size δ1 of the first clearance 81.

This will be described in more detail. A diameter d2 at the tip 71a of the outer circumferential surface 71 of the second elastic portion 70 is smaller than the diameter d1 at the outer circumferential surface 61 of the first elastic portion 60. The outer circumferential surface 71 is a tapered surface that is tapered toward the tip 71a of the outer circumferential surface 71 of the second elastic portion 70 from the tip 61a of the outer circumferential surface 61 of the first elastic portion 60. Moreover, the contour of the outer circumferential surface 71 is in a curved shape as a whole from a base end 71b (the tip 64 of the first elastic portion 60) up to the tip 71a.

It is preferable that the outer circumferential surface 71 of the second elastic portion 70 should include an annular first groove 72 indicated by a fictitious outline in FIG. 4. The first groove 72 is concaved in a curved shape across the whole circumference from the tip 61a of the outer circumferential surface 61 of the first elastic portion 60 toward a tip surface 73 of the second elastic portion 70.

The inner circumferential surface 74 of the second elastic portion 70 is a tapered surface along the extended line Lx of the tapered surface 63 of the first elastic portion 60 (the outer circumferential surface 34a of the internal cylinder portion 34). It is preferable that the tip 74a of the inner circumferential surface 74 of the second elastic portion 70 should be aligned with an intersection Px between the tip surface 73 of the second elastic portion 70 and the extended line Lx. A diameter d4 at the intersection Px (the tip 74a of the inner circumferential surface 74) is larger than a diameter D2 at the inner circumferential surface 34c of the internal cylinder portion 34. The length of the second elastic portion 70 is L3.

The inner circumferential surface 74 of the second elastic portion 70 includes an annular second groove 75 concaved across the whole circumference. The second groove 75 is concaved in a curved shape across the whole circumference from the tip 63a of the inner circumferential surface 63 of the first elastic portion 60 toward the tip surface 73 of the second elastic portion 70.

A boundary 76 between the inner circumferential surface 63 of the first elastic portion 60 and the inner circumferential surface 74 of the second elastic portion 70 is a surface in a circular arc shape across the whole circumference.

It is preferable that an annular and tabular plate 90 (a collar 90) should be provided at, at least a portion that contacts the stopper 51 in the tip surface 73 of the second elastic portion 70. The plate 90 is formed of a metal. The plate 90 is integrated with the second elastic portion 70 by, for example, integral molding, welding, or bonding. An outer circumferential surface 91 of the plate 90 is exposed from the second elastic portion 70. An outer diameter d5 at the plate 90 is the same as the diameter d2 at the tip 71a of the outer circumferential surface 71 of the second elastic portion 70. A pore diameter d6 of the plate 90 is smaller than a diameter d4 of the tip 74a (the intersection Px) of the inner circumferential surface 74 of the second elastic portion 70, and is the same as the diameter D2 of the inner circumferential surface 34c of the internal cylinder portion 34. The thickness of the plate 90 is Tp.

The stopper 51 (see FIG. 3) abuts the tip surface 73 of the second elastic portion 70 through the plate 90. The plate 90 can uniformly distribute compression load acting on the second elastic portion 70 from the stopper 51 to the tip surface 73 of the second elastic portion 70. In addition, the tip surface 73 of the second elastic portion 70 is protected against the exterior since covered by the plate 90.

Next, the characteristics of the elastic body 52 will be described with reference to FIG. 3 and FIG. 5 to FIG. 8.

As indicated by a fictitious outline in FIG. 3, the stopper 51 is located at a position apart from the elastic body 52. At this time, the value of depressing force fc when the end surface 51a of the stopper 51 depresses the tip surface 73 of the second elastic portion 70 through the plate 90 by t, i.e., the compression load fc is 0 (fc=0). The value of a compression amount St of the elastic body 52 is 0 (St=0).

Subsequently, when the end surface 51a of the stopper 51 depresses the tip surface 73 of the second elastic portion 70 through the plate 90, the compression load fc acts on the tip surface 73 of the second elastic portion 70 from the end surface 51a of the stopper 51. Upon receiving the compression load fc, the elastic body 52 starts compressing.

The outer circumferential surface 61 of the first elastic portion 60 and the bottom surface 62 thereof are wholly supported by the inner circumferential surface 33a of the external cylinder portion 33 and by the bottom surface 35 of the opening 32. Conversely, the first clearance 81 is provided at the internal side in the radial direction relative to the inner circumferential surface 63 of the first elastic portion 60. The second clearance 82 is provided at the external side in the radial direction relative to the outer circumferential surface 71 of the second elastic portion 70. Hence, the elastic body 52 starts compressing and deforming as a whole, and the inner circumferential surface 63 of the first elastic portion 60 starts elastically deforming toward the internal side in the radial direction, and the outer circumferential surface 71 of the second elastic portion 70 starts elastically deforming toward the external side in the radial direction. In accordance with such events, the compression amount St of the elastic body 52 relative to the compression load fc gradually increases.

As the compression load fc increases, the first clearance 81 and the second clearance 82 decrease. The size δ1 of the first clearance 81 is smaller than the size δ2 of the second clearance 82. Hence, the whole elastic body 52 is continuously compressed and deformed, and the inner circumferential surface 63 of the first elastic portion 60 contacts the outer circumferential surface 34a of the internal cylinder portion 34, and is supported (see FIG. 5). The value of the compression load fc at this time is fc1, and the value of the compression amount St of the elastic body 52 is St1. A compression range A1 for the value of the compression amount St of the elastic body 52 from 0 to fc1 will be referred to as "a first compression range A1".

Within the first compression range A1, the elastic body 52 shows first load characteristics (low-spring-rate characteristics) in which the ratio of the compression load fc per a unit amount of the compression amount St deforming in the axial direction of the turning shaft 26 gradually increases. That is, within the first compression range A1, since there are the first clearance 81 and the second clearance 82, the elastic body 52 is likely to elastically deform. The first load characteristics A1, i.e., the range of the first compression range is defined by, in particular, the size δ1 of the first clearance 81.

As the compression load fc further increases, the second clearance 82 further decreases. Hence, the whole elastic body 52 is continuously compressed and deformed, and the outer circumferential surface 71 of the second elastic portion 70 contacts the inner circumferential surface 33a of the external cylinder portion 33, and is supported (see FIG. 6). The value of the compression load fc at this time is fc2, and the value of the compression amount St of the elastic body 52 is St2. A compression range A2 for the value of the compression amount St of the elastic body 52 from fc1 to fc2 will be referred to as "a second compression range A2".

Within the second compression range A2, the elastic body 52 tends to show second load characteristics (intermediate-spring-rate characteristics) in which the ratio of the compression load fc per a unit amount of the compression amount St deforming in the axial direction of the turning shaft 26 increases in comparison with the first load characteristics. The second load characteristics, i.e., the range of the second compression range A2 is defined by, in particular, the size δ2 of the second clearance 82.

Figure 7:
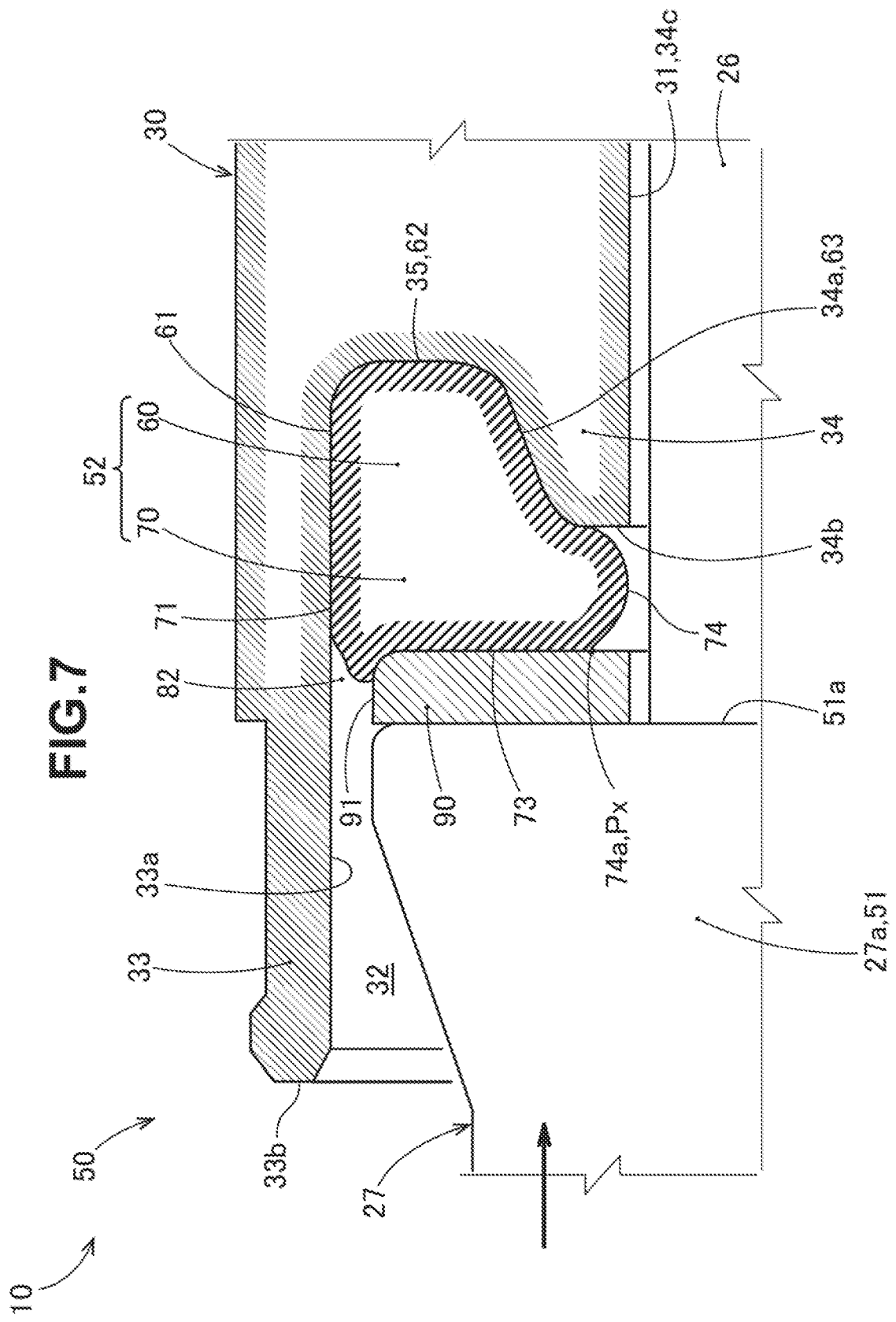
FIG. 7 is an action diagram for a later compression stage of the elastic body illustrated in FIG. 6.

As the compression load fc further increases, the inner circumferential surface 74 of the second elastic portion 70 expands toward the internal side in the radial direction, and a part of the second elastic portion 70 expands toward the stopper 51 from the second clearance 82 (see FIG. 7). That is, the compression and deformation of the elastic body 52 reach an uppermost limit. The value of the compression load fc at this time is fc3, and the value of the compression amount St of the elastic body 52 is St3. A compression range A3 for the value of the compression amount St of the elastic body 52 from fc2 to fc3 will be referred to as "a third compression range A3".

Within the third compression range A3, the elastic body 52 tends to show third load characteristics (high-spring-rate characteristics) in which the ratio of the compression load fc per a unit amount of the compression amount St changing in the axial direction of the turning shaft 26 keenly increases in comparison with the second load characteristics.

Figure 8:
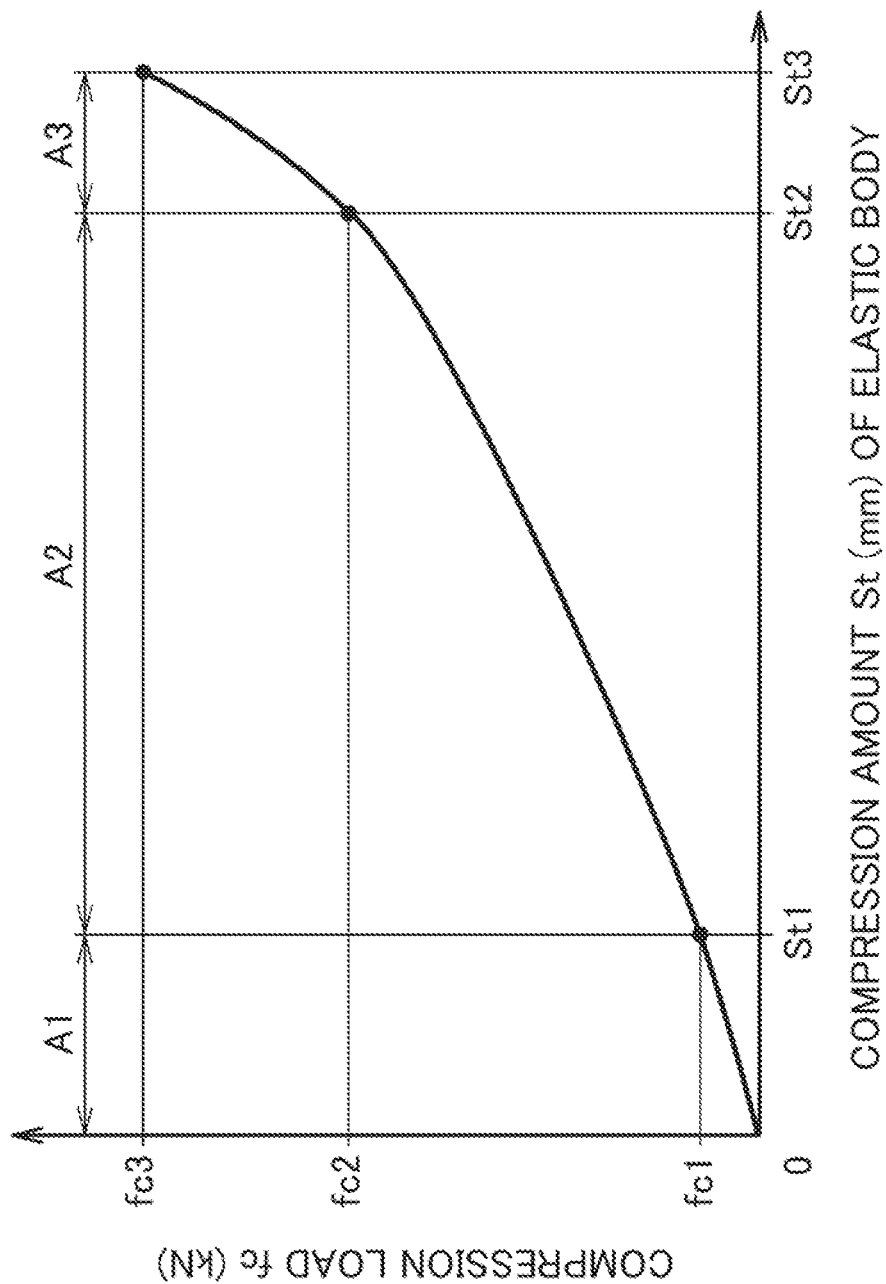
FIG. 8 is a characteristics diagram representing the characteristics of a compression amount of the elastic body illustrated in FIG. 3 relative to compression load.

The characteristics regarding the compression load fc and the compression amount St as described above will be summarized in FIG. 8. FIG. 8 is a characteristics diagram representing the characteristics of the compression amount St relative to the compression load fc with the vertical axis representing the compression load fc input to the elastic body 52 and the horizontal axis representing the compression amount St of the elastic body 52. According to the characteristic curve shown in the characteristics diagram, the following becomes apparent.

Within the first compression range A1, since an effect due to the first clearance 81 and to the second clearance 82 acts, the elastic body 52 is likely to deform. Within the second compression range A2, since the effect due to the first clearance 81 does not act but the effect due to the second clearance 82 only acts, the elastic body 52 is not likely to deform in comparison with the case of the first compression range A1. Within the third compression range A3, since the effect due to the first clearance 81 and to the second clearance 82 does not act, the elastic body 52 keenly becomes difficult to deform in comparison with the case of the second compression range A2. As described above, by designing the size δ1 of the first clearance 81 and the size δ2 of the second clearance 82 as appropriate, the respective compression ranges A1 to A3 can be set optimally.

Next, the actions of the attenuator device 50 will be described with reference to FIG. 3 and FIG. 5 to FIG. 8.

As indicated by a fictitious outline in FIG. 3, the stopper 51 is located at a position apart from the elastic body 52. Subsequently, the turning shaft 26 moves in the vehicle widthwise center direction by a so-called normal steering operation originating from the turning of the steering wheel 21 (see FIG. 1) and/or the drive by the electric motor 43. When the turning shaft 26 moves to the movable limit (the stroke end) in the vehicle widthwise center direction, the end surface 51a of the stopper 51 loosely abuts the tip surface 73 of the second elastic portion 70 through the plate 90. At this time, abutment load due to the normal steering operation is input to the tip surface 73 of the second elastic portion 70 from the end surface 51a of the stopper 51. Consequently, the elastic body 52 absorbs the abutment load (the compression load) due to the normal steering operation by elastic deformation. Subsequently, when the turning shaft 26 moves outwardly in the vehicle widthwise direction, the end surface 51a of the stopper 51 becomes apart from the plate 90. Consequently, the elastic body 52 returns to the original position by the own elasticity.

Figure 5:
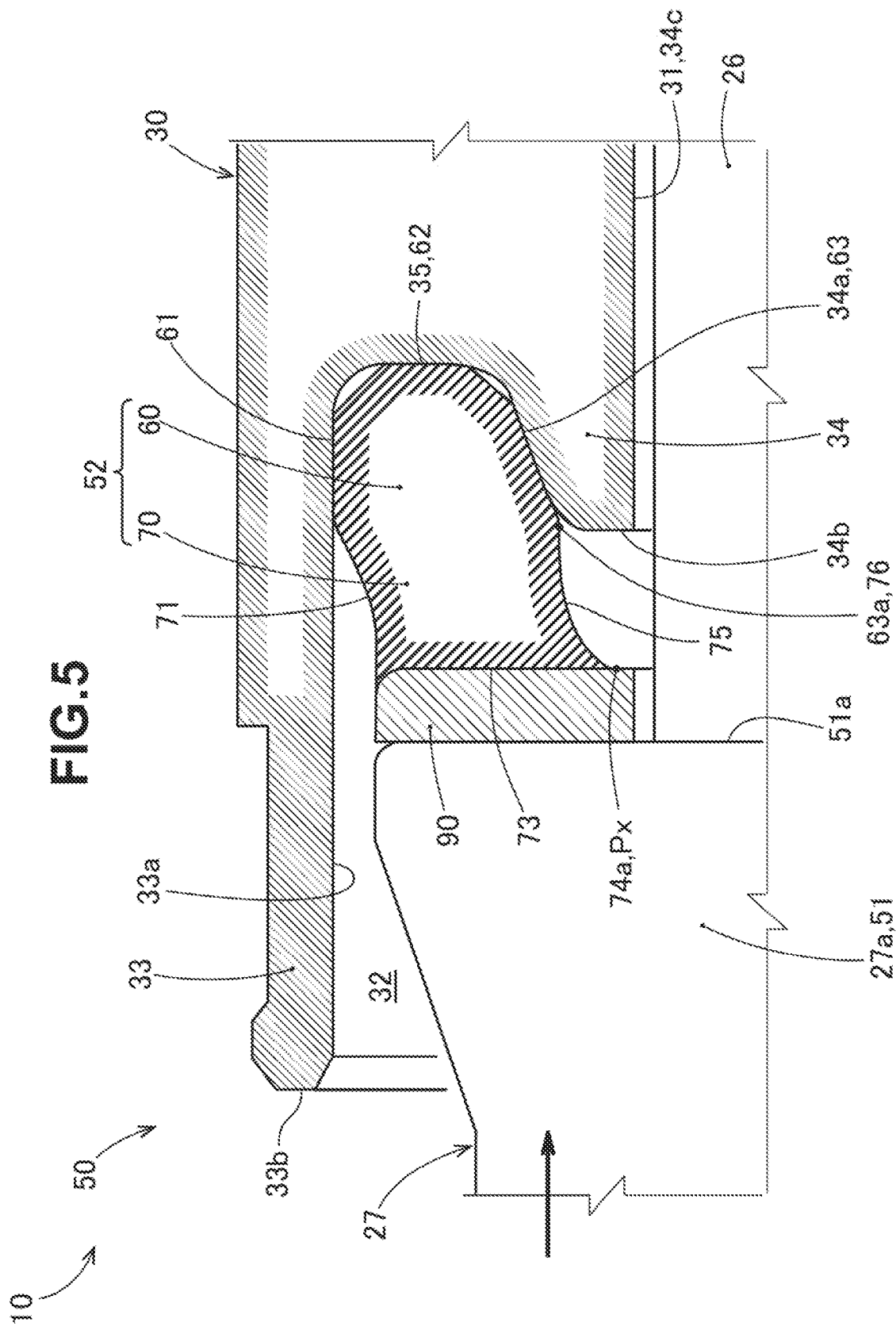
FIG. 5 is an action diagram for an initial compression stage of the elastic body illustrated in FIG. 3.
Figure 6:
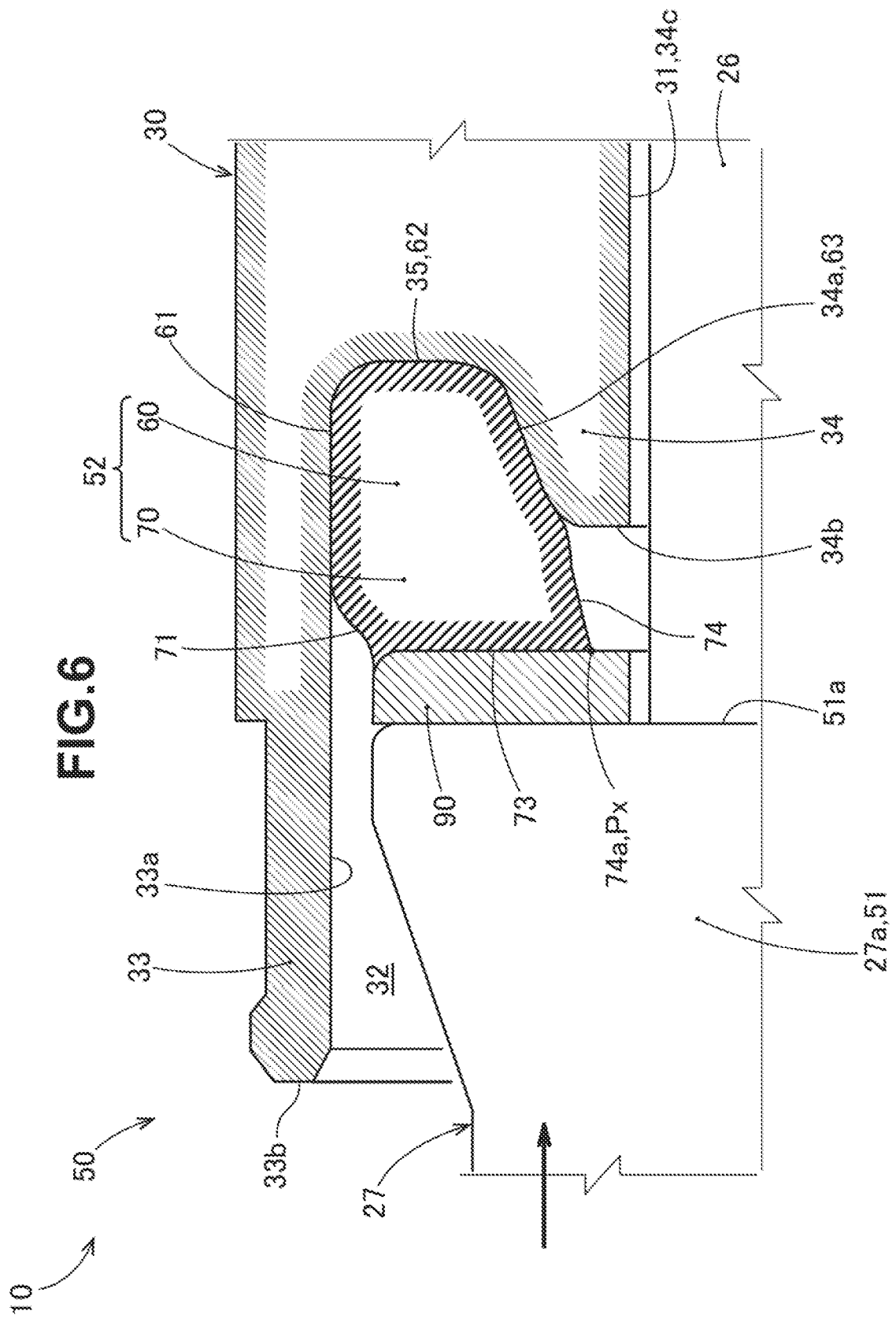
FIG. 6 is an action diagram for an intermediate compression stage of the elastic body illustrated in FIG. 5.

Moreover, as indicated by a fictitious outline in FIG. 3, when the stopper 51 is apart from the elastic body 52, and when, for example, the wheel 31 (see FIG. 1) goes over the curbstone of a road, large shock load in the axial direction acts from the wheel 31 to the stopper 51. Consequently, the end surface 51a of the stopper 51 abuts the tip surface 73 of the second elastic portion 70 through the plate 90. The shock load at this time is greater than the abutment load due to the normal steering operation. The shock load is input to the tip surface 73 of the second elastic portion 70 from the end surface 51a of the stopper 51. In this case, as illustrated in FIG. 5 to FIG. 7, the elastic body 52 largely deforms and absorbs the shock load. Consequently, the shock load which is to be received by the steering device 10 can be reduced.

The above description can be summarized as follows.

As illustrated in FIG. 1 to FIG. 4, the vehicular steering device 10 includes:

the turning shaft 26 movable in the vehicle widthwise direction;

the stopper 51 provided at the end 26a of the turning shaft 26;

the housing 30 which is extended in the vehicle widthwise direction so as to be able to store the turning shaft 26 therein, has the opening 32 at the end in the vehicle widthwise direction formed in a U-shaped cross-sectional shape and in an annular shape so as to be opened toward the stopper 51 by the external cylinder portion 33 located outwardly in the radial direction, the internal cylinder portion 34 located inwardly in the radial direction, and the annular and flat bottom surface 35 that closes a space between one end of the external cylinder portion 33 and one end of the internal cylinder portion 34, and has the length L1 from the bottom surface 35 to the open end 34b of the internal cylinder portion 34 shorter than the length L2 from the bottom surface 35 to the open end 33b of the external cylinder portion 33; and the elastic body 52 through which the turning shaft 26 is inserted so as to be movable in the vehicle widthwise direction, and which is formed of an annular integral molding component with elasticity including; the annular first elastic portion 60 having the same length L1 as the length L1 from the bottom surface 35 to the open end 34b of the internal cylinder portion 34, being fitted in the opening 32, having the whole surface supported by the inner circumferential surface 33a of the external cylinder portion 33 and the bottom surface 35, and being provided with the first clearance 81 from the outer circumferential surface 34a of the internal cylinder portion 34 across the whole circumference; and the annular second elastic portion 70 extending toward the stopper 51 from the first elastic portion 60 and being provided with the second clearance 82 from the inner circumferential surface 33a of the external cylinder portion 33 across the whole circumference, the second clearance being larger than the first clearance.

As described above, the first elastic portion 60 has the elastic deformation restricted by the inner circumferential surface 33a of the external cylinder portion 33 and by the bottom surface 35 of the opening 32, but has the first clearance 81 from the outer circumferential surfaces 34a of the internal cylinder portion 34, and thus the elastic deformation inwardly in the radial direction is permitted to some extent. The elastic deformation of the second elastic portion 70 outwardly in the radial direction is permitted to some extent by the second clearance 82 from the inner circumferential surfaces 33a of the external cylinder portion 33. Accordingly, the load characteristics (the spring-rate characteristics) of the elastic body 52 can be optimized by designing the size δ1 of the first clearance 81 and the size δ2 of the second clearance 82 as appropriate. Therefore, the vehicular steering device 10 can be provided which includes the elastic body 52 with further fine load absorbing characteristics.

Moreover, as illustrated in FIG. 3 and FIG. 4, the outer circumferential surface 71 of the second elastic portion 70 includes the annular first groove 72 that is concaved across the whole circumference. This further facilitates the elastic deformation of the second elastic portion 70.

Furthermore, as illustrated in FIG. 3 and FIG. 4, the outer circumferential surface 34a of the internal cylinder portion 34 is the tapered surface 34a tapered toward the open end 34b of the internal cylinder portion 34 from the bottom surface 35, and the size δ1 of the first clearance 81 between the outer circumferential surface 34a of the internal cylinder portion 34 and the inner circumferential surface 63 of the first elastic portion 60 is constant.

Accordingly, the load acting on the outer circumferential surface 34a of the internal cylinder portion 34 from the inner circumferential surface 63 of the first elastic portion 60 can be attenuated.

Still further, as illustrated in FIG. 3 and FIG. 4, the inner circumferential surface 74 of the second elastic portion 70 is a tapered surface along the extended line Lx of the tapered surface 63 of the first elastic portion 60, and includes the annular second groove 82 concaved across the whole circumference. This further facilitates the elastic deformation of the second elastic portion 70.

Yet still further, as illustrated in FIG. 3 and FIG. 4, the annular plate 90 is provided at, at least the portion that contacts the stopper 51 in the tip surface 73 of the second elastic portion 70. Accordingly, the compression load can be uniformly input to the tip surface 73 of the second elastic portion 70. The compression load can be efficiently absorbed by the elastic body 52.

In other words, as illustrated in FIG. 1 to FIG. 3, the vehicular steering device 10 includes:

the turning shaft 26 movable in the vehicle widthwise direction;

the stopper 51 provided at the end 26a of the turning shaft 26;

the housing 30 which is extended in the vehicle widthwise direction so as to be able to store the turning shaft 26 therein, has the opening 32 at the end in the vehicle widthwise direction formed in a U-shaped cross-sectional shape and in an annular shape so as to be opened toward the stopper 51 by the external cylinder portion 33 located outwardly in the radial direction, the internal cylinder portion 34 located inwardly in the radial direction, and the annular and flat bottom surface 35 that closes a space between one end of the external cylinder portion 33 and one end of the internal cylinder portion 34, and has the length L1 from the bottom surface 35 to the open end 34b of the internal cylinder portion 34 shorter than the length L2 from the bottom surface 35 to the open end 33b of the external cylinder portion 33; and the elastic body 52 through which the turning shaft 26 is inserted so as to be movable in the vehicle widthwise direction, and which is formed of an annular integral molding component with elasticity including; the annular first elastic portion 60 having the same length L1 as the length L1 from the bottom surface 35 to the open end 34b of the internal cylinder portion 34, being fitted in the opening 32, having the whole surface supported by the inner circumferential surface 33a of the external cylinder portion 33 and the bottom surface 35, and being provided with the first clearance 81 from the outer circumferential surfaces 34a of the internal cylinder portion 34 across the whole circumference; and the annular second elastic portion 70 extending toward the stopper 51 from the first elastic portion 60 and being provided with the second clearance 82 from the above-described inner circumferential surfaces 33a of the above-described external cylinder portion 33 across the whole circumference, the second clearance being larger than the first clearance.

The outer circumferential surface 71 of the second elastic portion 70 includes the annular first groove 72 that is concaved in a curved shape across the whole circumference from the tip 61a of the outer circumferential surface 61 of the first elastic portion 60 toward the tip surface 73 of the second elastic portion 70.

The outer circumferential surface 34a of the internal cylinder portion 34 is a tapered surface tapered toward the open end 34b of the internal cylinder portion 34 from the bottom surface 35, and an edge with the open end 34b of the internal cylinder portion 34 is a surface formed in a circular arc shape.

The size δ1 of the first clearance 81 between the outer circumferential surface 34a of the internal cylinder portion 34 and the inner circumferential surface 63 of the first elastic portion 60 is constant.

The inner circumferential surface 74 of the second elastic portion 70 is a tapered surface along the extended line Lx of the tapered surface 63 of the first elastic portion 60, and includes the annular second groove 82 concaved across the whole circumference.

The boundary 76 between the inner circumferential surface 63 of the first elastic portion 60 and the inner circumferential surface 74 of the second elastic portion 70 is a surface in a circular arc shape across the whole surface.

The annular plate 90 is provided at, at least the portion that contacts the stopper 51 in the tip surface 73 of the second elastic portion 70.

Next, with reference to FIG. 9, a vehicular steering device 10A according to a second embodiment will be described.

Second Embodiment

Figure 9:
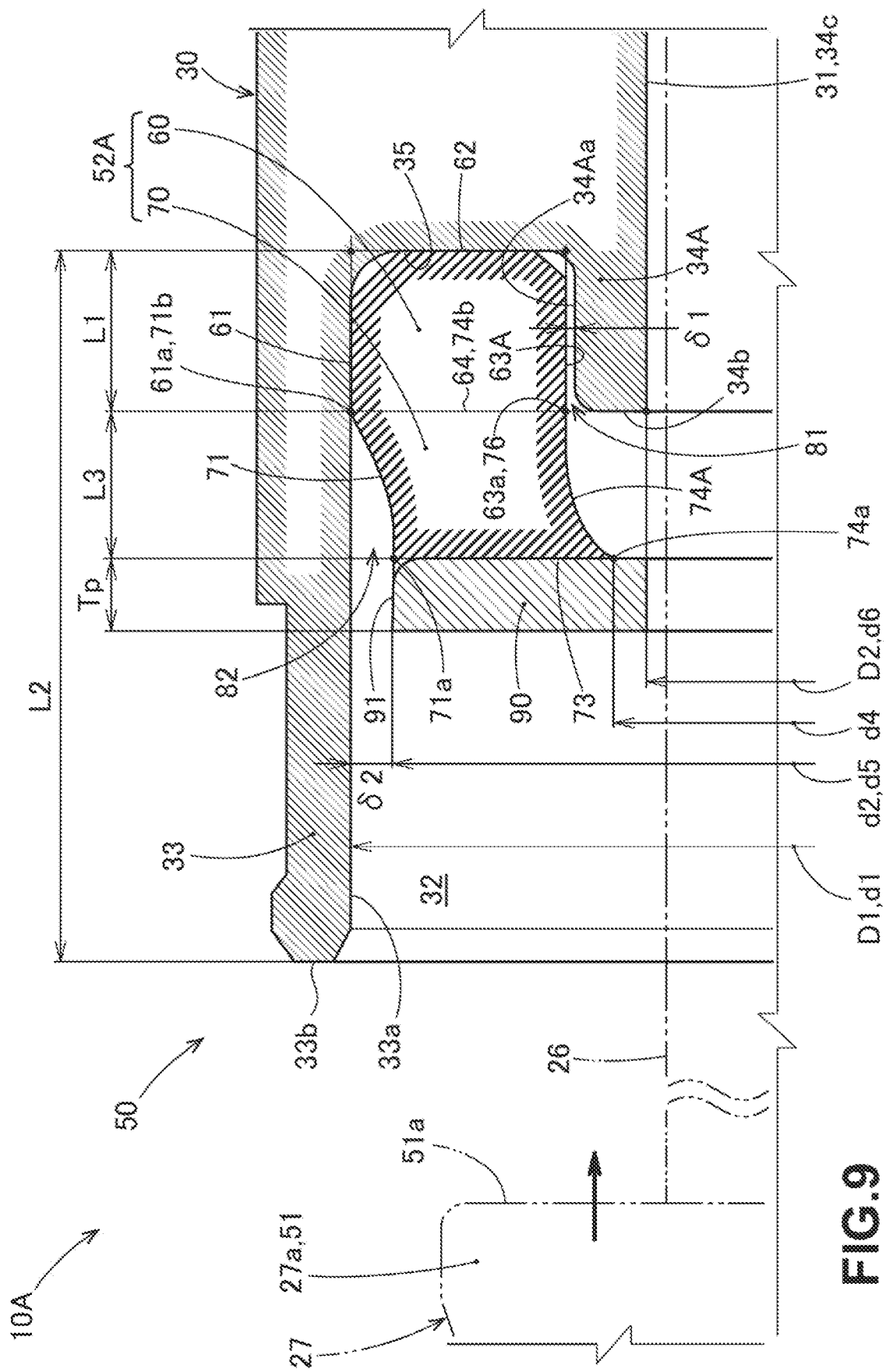
FIG. 9 is a cross-sectional view of an elastic body provided at an opening of a housing of a vehicular steering device according to a second embodiment.

FIG. 9 illustrates a cross-sectional structure of an elastic body 52A which is provided in the opening 32 of the housing 30 of the vehicular steering device 10A according to the second embodiment, and which is illustrated in corresponding ways to FIG. 3.

The vehicular steering device 10A illustrated in FIG. 9 has features such that the following two structures are changed, and the other basic structure is common to the above-described vehicular steering device 10 illustrated in FIG. 1 to FIG. 7. The common component to that of the above-described vehicular steering device 10 will be denoted by the same reference numeral, and the detailed description thereof will be omitted.

The first changed part is that the outer circumferential surface 34a of the internal cylinder portion 34 of the first embodiment illustrated in FIG. 3 is changed to an outer circumferential surface 34Aa of an internal cylinder portion 34A illustrated in FIG. 9. The outer circumferential surface 34Aa of the second embodiment is not a tapered surface but a straight surface in parallel with the inner circumferential surface 33a of the external cylinder portion 33.

The second changed part is that the elastic body 52 of the first embodiment illustrated in FIG. 3 is changed to an elastic body 52A. According to the elastic body 52A of the second embodiment, an inner circumferential surface 63A of the first elastic portion 60 is a straight surface in parallel with the outer circumferential surface 34Aa of the internal cylinder portion 34A. Like the first embodiment, the first clearance 81 with the size δ1 is provided between the outer circumferential surface 34Aa of the internal cylinder portion 34A and the inner circumferential surface 63A of the first elastic portion 60. An inner circumferential surface 74A of the second elastic portion 70 according to the second embodiment is a straight surface along the inner circumferential surface 63A of the first elastic portion 60, and does not include the second groove 75 of the first embodiment (see FIG. 3).

Next, with reference to FIG. 10, a vehicular steering device 10B according to a third embodiment will be described.

Third Embodiment

Figure 10:
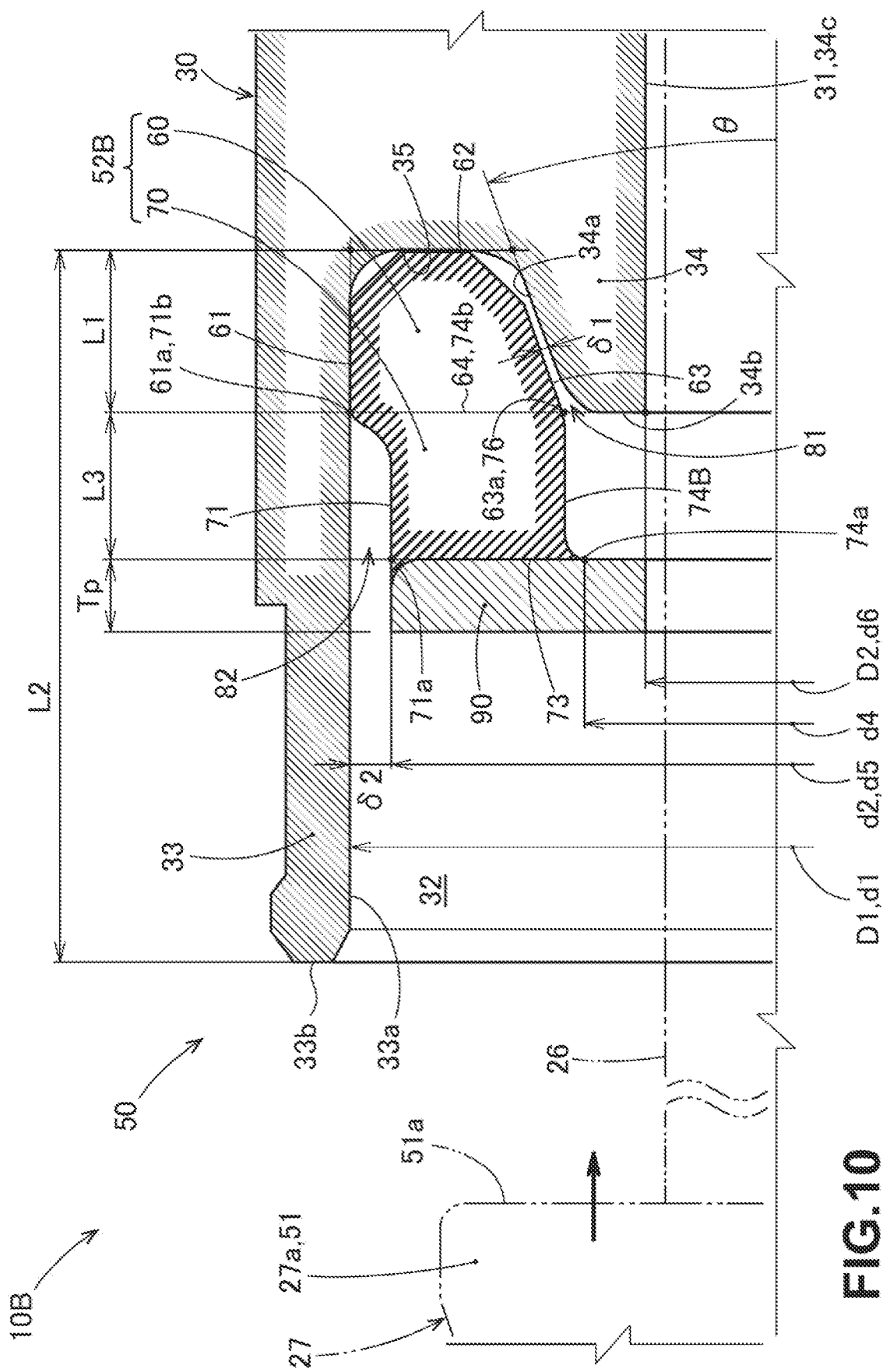
FIG. 10 is a cross-sectional view of an elastic body provided at an opening of a housing of a vehicular steering device according to a third embodiment.

FIG. 10 illustrates a cross-sectional structure of an elastic body 52B which is provided in the opening 32 of the housing 30 of the vehicular steering device 10B according to the third embodiment, and which is illustrated in corresponding ways to FIG. 3.

The vehicular steering device 10B illustrated in FIG. 10 has a feature such that the elastic body 52 of the first embodiment illustrated in FIG. 3 is changed to the elastic body 52B, and the other basic structure is common to the above-described vehicular steering device 10 illustrated in FIG. 1 to FIG. 7. The common component to that of the above-described vehicular steering device 10 will be denoted by the same reference numeral, and the detailed description thereof will be omitted.

The elastic body 52B of the third embodiment does not include the first groove 72 of the first embodiment (see FIG. 3) in the outer circumferential surface 71 of the second elastic portion 70. Moreover, according to the elastic body 52B of the third embodiment, an inner circumferential surface 74B of the second elastic portion 70 is a straight surface in parallel with the outer circumferential surface 71 of the second elastic portion 70, and does not include the second groove 75 of the first embodiment (see FIG. 3).

Next, with reference to FIG. 11 to FIG. 15, a vehicular steering device 10C according to a fourth embodiment will be described.

Fourth Embodiment

Figure 11:
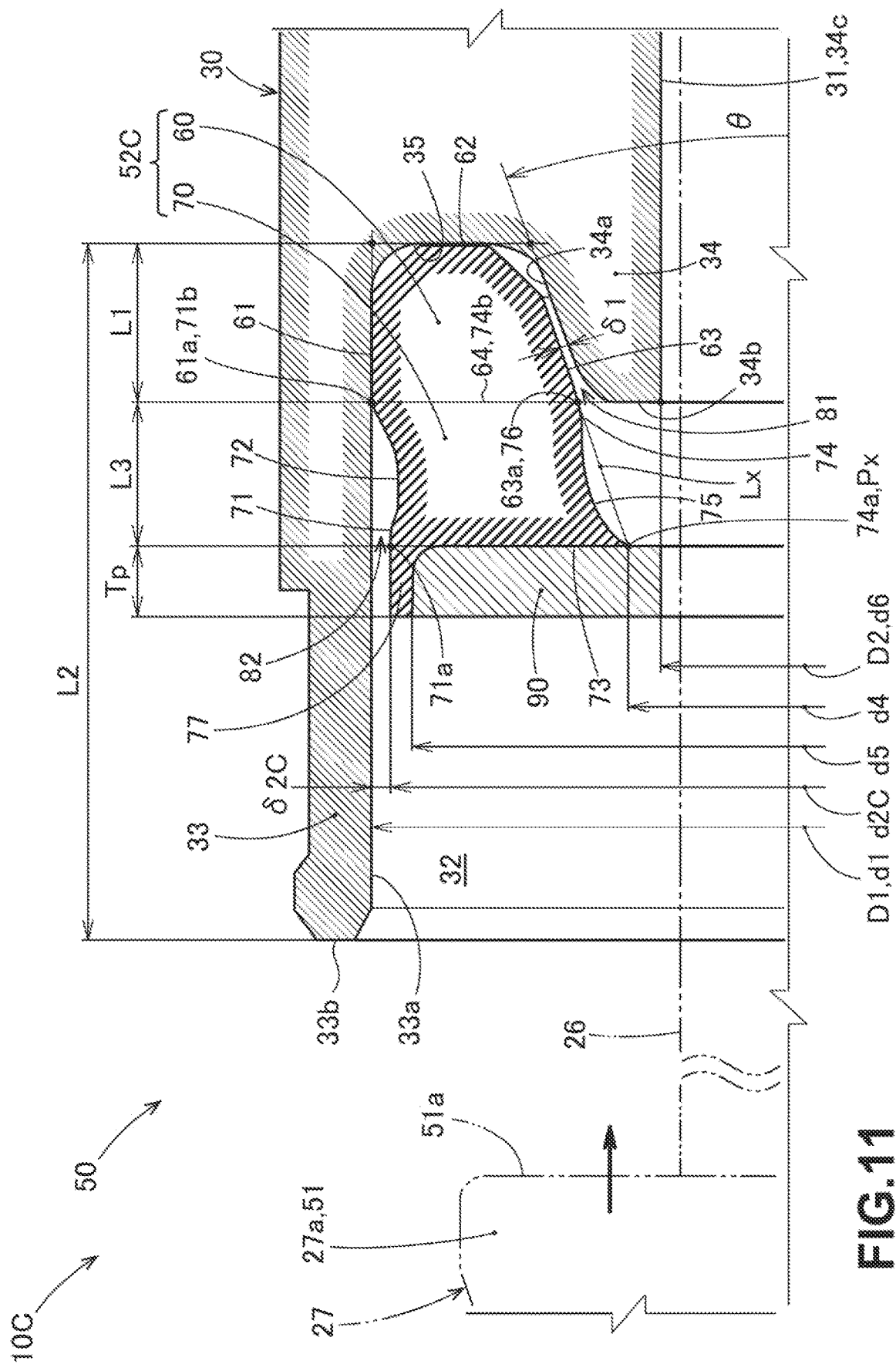
FIG. 11 is a cross-sectional view of an elastic body provided at an opening of a housing of a vehicular steering device according to a fourth embodiment.
Figure 12:
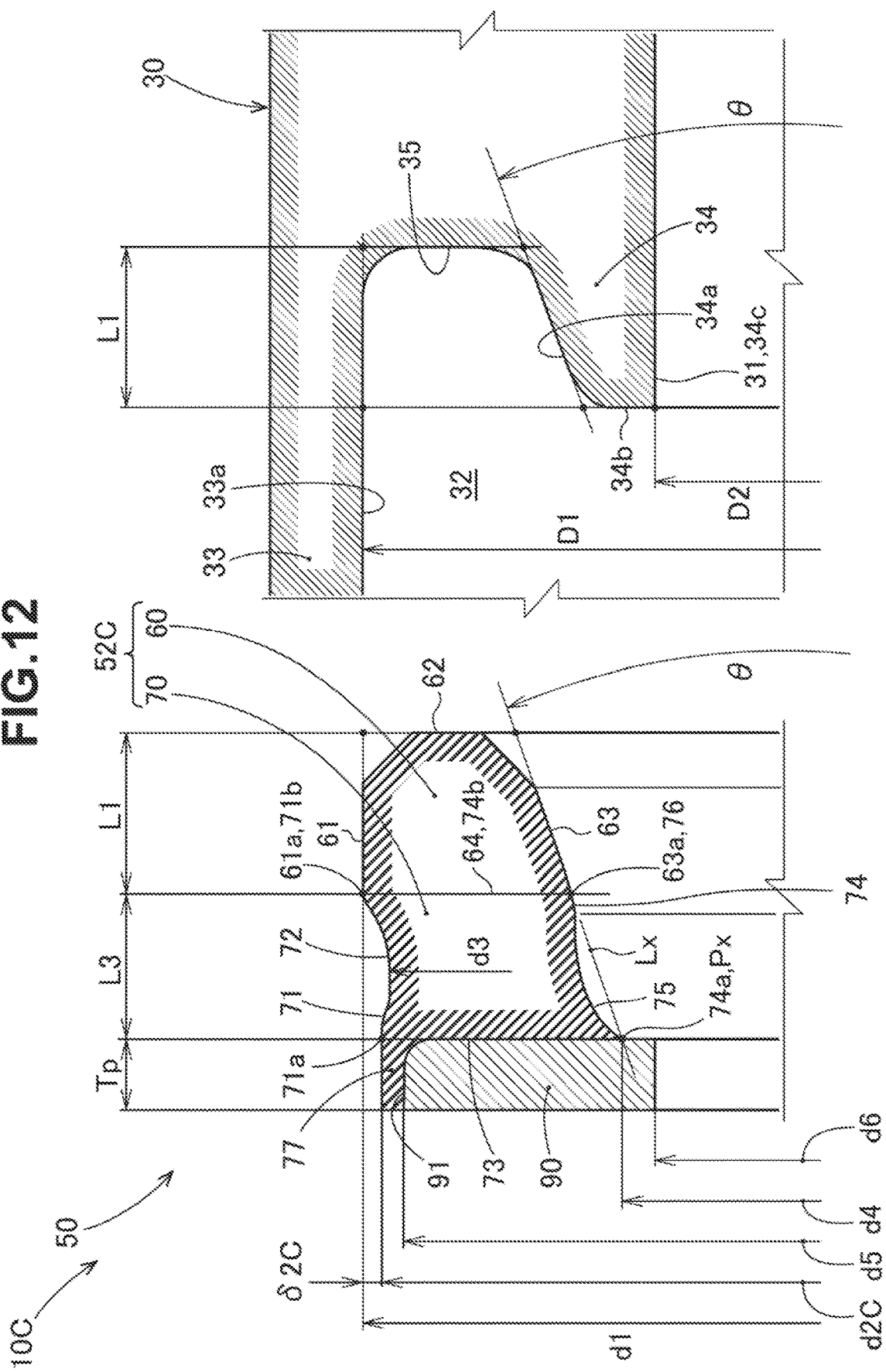
FIG. 12 is an exploded diagram of the opening of the housing, and of the elastic body illustrated in FIG. 11.
Figure 13:
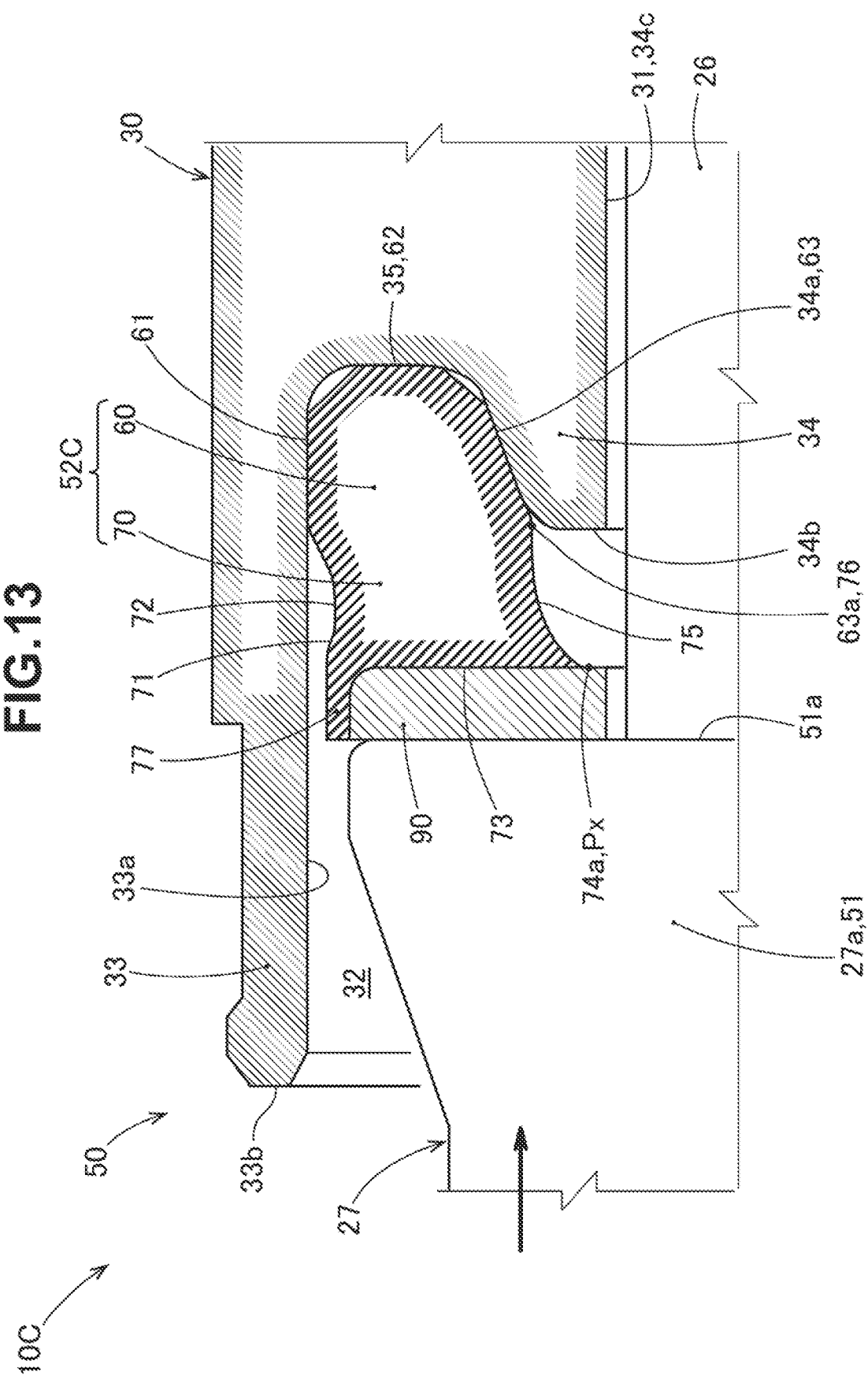
FIG. 13 is an action diagram for an initial compression stage of the elastic body illustrated in FIG. 11.
Figure 14:
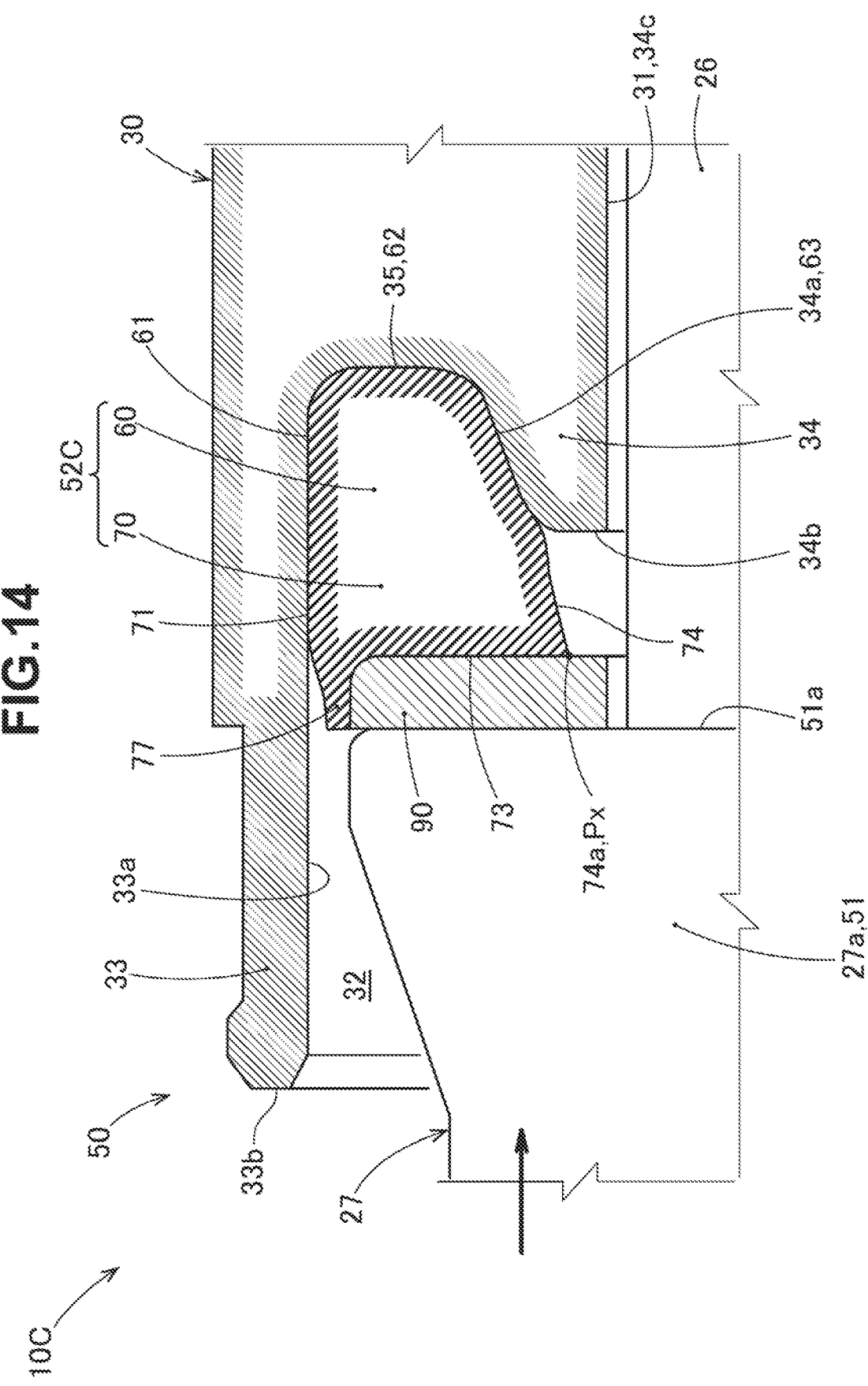
FIG. 14 is an action diagram for an intermediate compression stage of the elastic body illustrated in FIG. 13.

FIG. 11 illustrates a cross-sectional structure of an elastic body 52C which is provided in the opening 32 of the housing 30 of the vehicular steering device 10C according to the fourth embodiment, and which is illustrated in corresponding ways to FIG. 3. FIG. 12 illustrates a structure in which the opening 32 of the housing 30 and the elastic body 52C both illustrated in FIG. 11 are disassembled, and which illustrates in corresponding ways to FIG. 4.

The vehicular steering device 10C illustrated in FIG. 11 and FIG. 12 has a feature such that the elastic body 52 of the first embodiment illustrated in FIG. 3 to FIG. 4 is changed to the elastic body 52C, and the other basic structure is common to the above-described vehicular steering device 10 illustrated in FIG. 1 to FIG. 7. The common component to that of the above-described vehicular steering device 10 will be denoted by the same reference numeral, and the detailed description thereof will be omitted.

According to the elastic body 52C of the fourth embodiment, the second elastic portion 70 includes an annular extended portion 77 extended (expanded) toward the stopper 51 from the tip surface 73. The shape of the extended portion 77 is in a true circular shape concentric to the second elastic portion 70. An outer circumferential surface 91 of the plate 90 is embedded in the extended portion 77. The plate 90 is integrated with the tip surface 73 of the second elastic portion 70 and the extended portion 77 thereof by, for example, integral molding, welding or bonding.

As described above, the outer circumferential surface 91 of the plate 90 is embedded in the extended portion 77. Hence, the plate 90 is integrated with the tip surface 73 of the second elastic portion 70 and also the extended portion 77. Accordingly, a peeling of the plate 90 relative to the tip surface 73 of the second elastic portion 70 can be further surely suppressed.

A diameter d2C at the tip 71a of the outer circumferential surface 71 of the second elastic portion 70 is larger than an outer diameter d5 of the plate 90. Moreover, the diameter d2C at the tip 71a of the outer circumferential surface 71 is larger than the diameter d2 at the tip 71a of the first embodiment illustrated in FIG. 3 to FIG. 4 (d2C>d2=d5).

The second clearance 82 is provided between the outer circumferential surface 71 of the second elastic portion 70 and the inner circumferential surface 33a of the external cylinder portion 33 across the whole circumference. A size δ2C of the second clearance 82 is designed with the elastic deformation amount of the whole elastic body 52 when compression load acts on the elastic body 52 from the stopper 51 being taken into consideration, and is larger than the size δ1 of the first clearance 81. Moreover, the size δ2C of the second clearance 82 may be designed so as to be smaller than the size δ2 of the second clearance 82 according to the first embodiment illustrated in FIG. 3 and FIG. 4 (δ2C<δ2).

This will be described in more details. The diameter d2C at the tip 71a of the outer circumferential surface 71 of the second elastic portion 70 is smaller than the diameter d1 at the outer circumferential surface 61 of the first elastic portion 60. The outer circumferential surface 71 of the second elastic portion 70 includes the annular first groove 72. The first groove 72 is concaved in a curved shape across the whole circumference toward the tip surface 73 of the second elastic portion 70 from the tip 61a of the outer circumferential surface 61 of the first elastic portion 60. A diameter d3 (see FIG. 12) of the most concaved portion of the first groove 72 is smaller than the diameter d2C at the tip 71a of the outer circumferential surface 71 of the second elastic portion 70.

As described above, the outer circumferential surface 71 of the second elastic portion 70 includes the annular first groove 72 concaved across the whole circumference. This further facilitates the elastic deformation of the second elastic portion 70.

Next, with reference to FIG. 11, FIG. 13 to FIG. 15, the characteristics of the elastic body 52C will be described. Note that since the characteristics of the elastic body 52C are the same as the characteristics of the elastic body 52 of the first embodiment illustrated in FIG. 3, FIG. 5 to FIG. 8, only a summary will be described.

As illustrated in FIG. 11, when the end surface 51a of the stopper 51 depresses the tip surface 73 of the second elastic portion 70 through the plate 90, the compression load fc (unillustrated) acts on the tip surface 73 of the second elastic portion 70 from the end surface 51a of the stopper 51. As the compression load fc increases, the first clearance 81 and the second clearance 82 are reduced. The elastic body 52 is continuously compressed and deformed as a whole, and the inner circumferential surface 63 of the first elastic portion 60 contacts the outer circumferential surface 34a of the internal cylinder portion 34, and is supported (see FIG. 13). In the state illustrated in FIG. 13, like the first embodiment in FIG. 5, the first load characteristics (the low-spring-rate characteristics) are exerted.

As the compression load fc further increases, the second clearance 82 are further reduced. Hence, the elastic body 52 is continuously compressed and deformed as a whole, and the outer circumferential surface 71 of the second elastic portion 70 contacts the inner circumferential surface 33a of the external cylinder portion 33, and is supported (see FIG. 14). In the state illustrated in FIG. 14, like the first embodiment in FIG. 6, there is a tendency that the second load characteristics (the intermediate-spring-rate characteristics) are exerted.

As the compression load fc further increases, the inner circumferential surface 74 of the second elastic portion 70 are expanded inwardly in the radial direction, and the extended portion 77 of the second elastic portion 70 expands toward the stopper 51 (see FIG. 15). That is, the compressive deformation of the elastic body 52 reaches the limit. In the state illustrated in FIG. 15, like the first embodiment in FIG. 7, there is a tendency that the third load characteristics (the high-spring-rate characteristics) are exerted.

The vehicular steering device 10C according to the fourth embodiment accomplishes the same actions and advantageous effects as those of the vehicular steering device 10 according to the first embodiment illustrated in FIG. 1 to FIG. 8.

Note that the vehicular steering devices 10, 10A, 10B and 10C according to the present disclosure are not limited to the embodiments as far as the actions and the advantageous effects of the present disclosure are accomplished.

For example, according to the present disclosure, the vehicular steering devices 10, 10A, 10B and 10C may employ a structure that includes only the steering system 20, and may be a so-called manually operated type steering device that does not include the auxiliary torque mechanism 40.

Moreover, the vehicular steering devices 10, 10A, 10B and 10C may be a so-called steer-by-wire type steering device which mechanically separates the steering wheel 21 and the turning shaft 26, causes a turn actuator (unillustrated) to generate turn force in accordance with the steered amount of the steering wheel 21, and transmits the turn force to the turning shaft 26.

Moreover, the vehicular steering devices 10, 10A, 10B and 10C may employ a structure in which equal to or greater than two of those are arbitrary combined as appropriate.

INDUSTRIAL APPLICABILITY

The vehicular steering devices 10, 10A, 10B and 10C according to the present disclosure are suitably to be loaded on a vehicle.

REFERENCE SIGNS LIST

10, 10A, 10B, 10C Vehicular steering device
26 Turning shaft
26*a* Shaft end (end) of turning shaft
30 Housing
32 Opening
33 External cylinder portion (first cylinder portion)
33*a* Inner circumferential surface of external cylinder portion
33*b* Open end of external cylinder portion (opened end surface
of external cylinder portion)
34 Internal cylinder portion (second cylinder portion)
34*a* Outer circumferential surface of internal cylinder portion
(tapered surface of internal cylinder portion)
34*b* Open end of internal cylinder portion (opened end surface
of internal cylinder portion)
34*c* Inner circumferential surface of internal cylinder portion
50 Attenuator device
51 Stopper
52, 52A, 52B Elastic body
60 First elastic portion
61 Outer circumferential surface of first elastic portion
61*a* Tip of outer circumferential surface of first elastic portion
62 Bottom surface of first elastic portion
63 Inner circumferential surface (tapered surface) of first elastic portion
63*a* Tip of inner circumferential surface of first elastic portion
64 Tip of first elastic portion
70 Second elastic portion
71 Outer circumferential surface of second elastic portion
72 First groove
73 Tip surface of second elastic portion
74 Inner circumferential surface of second elastic portion
74*a* Tip of inner circumferential surface of second elastic portion
75 Second groove
77 Extended portion
81 First clearance
82 Second clearance
90 Plate L1 Length from bottom surface to open end of internal cylinder portion
L2 Length from bottom surface to open end of external cylinder portion
δ1 Size of first clearance
δ2, δ2C Size of second clearance

The invention claimed is:

1. A vehicular steering device comprising:
a turning shaft movable in a vehicle widthwise direction;
a stopper provided at an end of the turning shaft;
a housing which is extended in the vehicle widthwise direction so as to be able to store the turning shaft therein, has an opening at an end in the vehicle widthwise direction formed in a U-shaped cross-sectional shape and in an annular shape so as to be opened toward the stopper by an external cylinder portion located outwardly in a radial direction, an internal cylinder portion located inwardly in the radial direction, and an annular and flat bottom surface that closes a space between one end of the external cylinder portion and one end of the internal cylinder portion, and has a length from the bottom surface to an open end of the internal cylinder portion shorter than a length from the bottom surface to the open end of the external cylinder portion; and
an elastic body through which the turning shaft passes so as to be movable in the vehicle widthwise direction, and which is formed of an annular integral molding component with elasticity comprising:
an annular first elastic portion having a same length as the length from the bottom surface to the open end of the internal cylinder portion, being fitted in the opening, having a whole surface supported by an inner circumferential surface of the external cylinder portion and the bottom surface, and being provided with a first clearance across a whole circumference from the outer circumferential surfaces of the internal cylinder portion; and
an annular second elastic portion extending toward the stopper from the first elastic portion and being provided with a second clearance across the whole circumference from the inner circumferential surface of the external cylinder portion, the second clearance being larger than the first clearance.

2. The vehicular steering device according to claim 1, wherein an outer circumferential surface of the second elastic portion comprises an annular first groove that is concaved across a whole circumference.

3. The vehicular steering device according to claim 1, wherein:
the outer circumferential surface of the internal cylinder portion is a tapered surface tapered toward the open end of the internal cylinder portion from the bottom surface; and
a size of the first clearance between the outer circumferential surface of the internal cylinder portion and an inner circumferential surface of the first elastic portion is constant.

4. The vehicular steering device according to claim 3, wherein an inner circumferential surface of the second elastic portion is a tapered surface along an extended line of the tapered surface of the first elastic portion, and comprises an annular second groove concaved across the whole circumference.

5. The vehicular steering device according to claim 1, wherein an annular plate is provided at, at least a portion that contacts the stopper in a tip surface of the second elastic portion.

6. The vehicular steering device according to claim 5, wherein:
the second elastic portion comprises an extended portion that extends toward the stopper from the tip surface; and
an outer circumferential surface of the plate is embedded in the extended portion.

7. The vehicular steering device according to claim 2, wherein:
the outer circumferential surface of the internal cylinder portion is a tapered surface tapered toward the open end of the internal cylinder portion from the bottom surface; and
a size of the first clearance between the outer circumferential surface of the internal cylinder portion and an inner circumferential surface of the first elastic portion is constant.

8. The vehicular steering device according to claim 7, wherein an inner circumferential surface of the second elastic portion is a tapered surface along an extended line of the tapered surface of the first elastic portion, and comprises an annular second groove concaved across the whole circumference.

9. The vehicular steering device according to claim 2, wherein an annular plate is provided at, at least a portion that contacts the stopper in a tip surface of the second elastic portion.

10. The vehicular steering device according to claim 9, wherein:
the second elastic portion comprises an extended portion that extends toward the stopper from the tip surface; and
an outer circumferential surface of the plate is embedded in the extended portion.

11. The vehicular steering device according to claim 3, wherein an annular plate is provided at, at least a portion that contacts the stopper in a tip surface of the second elastic portion.

12. The vehicular steering device according to claim 11, wherein:
the second elastic portion comprises an extended portion that extends toward the stopper from the tip surface; and
an outer circumferential surface of the plate is embedded in the extended portion.

13. The vehicular steering device according to claim 7, wherein an annular plate is provided at, at least a portion that contacts the stopper in a tip surface of the second elastic portion.

14. The vehicular steering device according to claim 13, wherein:
the second elastic portion comprises an extended portion that extends toward the stopper from the tip surface; and
an outer circumferential surface of the plate is embedded in the extended portion.

15. The vehicular steering device according to claim 4, wherein an annular plate is provided at, at least a portion that contacts the stopper in a tip surface of the second elastic portion.

16. The vehicular steering device according to claim 15, wherein:
the second elastic portion comprises an extended portion that extends toward the stopper from the tip surface; and
an outer circumferential surface of the plate is embedded in the extended portion.

17. The vehicular steering device according to claim 8, wherein an annular plate is provided at, at least a portion that contacts the stopper in a tip surface of the second elastic portion.

18. The vehicular steering device according to claim 17, wherein:
the second elastic portion comprises an extended portion that extends toward the stopper from the tip surface; and
an outer circumferential surface of the plate is embedded in the extended portion.

19. A vehicular steering device comprising:
a turning shaft movable in a vehicle widthwise direction;
a stopper provided at an end of the turning shaft;
a housing which is extended in the vehicle widthwise direction so as to be able to store the turning shaft therein, has an opening at an end in the vehicle widthwise direction formed in a U-shaped cross-sectional shape and in an annular shape so as to be opened toward the stopper by an external cylinder portion located outwardly in a radial direction, an internal cylinder portion located inwardly in the radial direction, and an annular and flat bottom surface that closes a space between one end of the external cylinder portion and one end of the internal cylinder portion, and has a length from the bottom surface to an open end of the internal cylinder portion shorter than a length from the bottom surface to the open end of the external cylinder portion; and
an elastic body through which the turning shaft passes so as to be movable in the vehicle widthwise direction, and which is formed of an annular integral molding component with elasticity comprising:
an annular first elastic portion having a same length as the length from the bottom surface to the open end of the internal cylinder portion, being fitted in the opening, having a whole surface supported by an inner circumferential surface of the external cylinder portion and the bottom surface, and being provided with a first clearance across a whole circumference from the outer circumferential surface of the internal cylinder portion; and
an annular second elastic portion extending toward the stopper from the first elastic portion and being provided with a second clearance across the whole circumference from the inner circumferential surface of the external cylinder portion, the second clearance being larger than the first clearance,
wherein an outer circumferential surface of the second elastic portion comprises an annular first groove that is concaved in a curved shape across a whole circumference from a tip of an outer circumferential surface of the first elastic portion toward a tip surface of the second elastic portion,
wherein the outer circumferential surface of the internal cylinder portion is a tapered surface tapered toward the open end of the internal cylinder portion from the bottom surface, and an edge with the open end of the internal cylinder portion is a surface formed in a circular arc shape, wherein a size of the first clearance between the outer circumferential surface of the internal cylinder portion and the inner circumferential surface of the first elastic portion is constant, wherein an inner circumferential surface of the second elastic portion is a tapered surface along an extended line of the tapered surface of the first elastic portion, and comprises an annular second groove concaved across a whole circumference, wherein a boundary between the inner circumferential surface of the first elastic portion and the inner circumferential surface of the second elastic portion is a surface in a circular arc shape across a whole surface, and wherein an annular plate is provided at, at least a portion that contacts the stopper in the tip surface of the second elastic portion.

20. The vehicular steering device according to claim 19, wherein:

the second elastic portion comprises an extended portion that extends toward the stopper from the tip surface; and an outer circumferential surface of the plate is embedded in the extended portion.

* * * * *